US006995935B2

(12) United States Patent
Ehrlich

(10) Patent No.: US 6,995,935 B2
(45) Date of Patent: Feb. 7, 2006

(54) METHODS FOR DETECTING MULTIPLE OCCURRENCES OF A SAM PATTERN TO THEREBY IMPROVE SERVO-DEMODULATION ROBUSTNESS

(75) Inventor: Richard M. Ehrlich, Saratoga, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 188 days.

(21) Appl. No.: 10/413,043

(22) Filed: Apr. 14, 2003

(65) Prior Publication Data

US 2004/0125482 A1 Jul. 1, 2004

Related U.S. Application Data

(60) Provisional application No. 60/436,671, filed on Dec. 27, 2002.

(51) Int. Cl.
G11B 5/09 (2006.01)
(52) U.S. Cl. .................. 360/51; 360/53; 360/78.08
(58) Field of Classification Search ............... 360/51, 360/53, 31, 78.06, 78.08, 78.14
See application file for complete search history.

(56) References Cited

U.S. PATENT DOCUMENTS

| 4,188,646 | A |   | 2/1980  | Sordello et al. |
|-----------|---|---|---------|-----------------|
| 4,271,519 | A | * | 6/1981  | Hall .............................. 714/771 |
| 5,050,016 | A |   | 9/1991  | Squires |
| 5,170,299 | A |   | 12/1992 | Moon |
| 5,255,136 | A |   | 10/1993 | Machado et al. |
| 5,384,671 | A |   | 1/1995  | Fisher |
| 5,420,730 | A |   | 5/1995  | Moon et al. |
| 5,444,583 | A | * | 8/1995  | Ehrlich et al. ............ 360/78.09 |
| 5,477,103 | A |   | 12/1995 | Romano et al. |
| 5,544,135 | A |   | 8/1996  | Akin, Jr. et al. |
| 5,585,975 | A |   | 12/1996 | Bliss |
| 5,706,265 | A |   | 1/1998  | Bang |
| 5,796,535 | A |   | 8/1998  | Tuttle et al. |
| 5,903,410 | A |   | 5/1999  | Blaum et al. |
| 5,963,387 | A |   | 10/1999 | Son |
| 5,966,258 | A |   | 10/1999 | Bliss |
| 6,021,012 | A | * | 2/2000  | Bang ........................... 360/51 |
| 6,108,153 | A |   | 8/2000  | Glover |
| 6,111,710 | A |   | 8/2000  | Feyh et al. |
| 6,115,199 | A | * | 9/2000  | Bang ........................... 360/51 |
| 6,122,131 | A | * | 9/2000  | Jeppson ................... 360/77.02 |
| 6,155,199 | A |   | 12/2000 | Chen et al. |
| 6,181,505 | B1 |  | 1/2001  | Sacks et al. |
| 6,392,831 | B1 | * | 5/2002  | Yeo et al. ...................... 360/53 |
| 6,483,789 | B1 | * | 11/2002 | Kubota et al. ........... 369/53.16 |
| 6,487,032 | B1 |  | 11/2002 | Cloke et al. |
| 6,504,663 | B2 |  | 1/2003  | Hirano et al. |
| 6,525,615 | B1 |  | 2/2003  | Masenas et al. |

(Continued)

OTHER PUBLICATIONS

Abramovitch et al., "Customizable Coherent Servo Demodulation for Disk Drives," Sep. 1998, IEEEE/ASME Transactions on Mechatronics, vol. 3, No. 3, pp. 184-193.

*Primary Examiner*—David Hudspeth
*Assistant Examiner*—Dismery Mercedes
(74) *Attorney, Agent, or Firm*—Fliesler Meyer LLP

(57) ABSTRACT

Methods are provided for improving servo-demodulation robustness. Multiple occurrences of a SAM pattern are searched for in a single servo wedge. Each detection of the SAM pattern in the servo wedge is charactered as a good SAM detection or a bad SAM detection. If more than one detection of the SAM pattern in the servo wedge are characterized as good SAM detections, one of the detections is selected as the best good SAM detection. Further servo functions can then be performed based on the best good SAM detection.

28 Claims, 10 Drawing Sheets

U.S. PATENT DOCUMENTS

| | | | |
|---|---|---|---|
| 6,545,836 B1 | 4/2003 | Ioannou | |
| 6,594,103 B1 | 7/2003 | Despain | |
| 6,678,110 B2 | 1/2004 | Ellis | |
| 6,680,807 B1 * | 1/2004 | She et al. | 360/51 |
| 6,754,019 B2 * | 6/2004 | Tokizono et al. | 360/53 |
| 6,760,173 B2 * | 7/2004 | Kuki et al. | 360/51 |
| 2003/0026017 A1 | 2/2003 | Chong et al. | |
| 2003/0026363 A1 | 2/2003 | Stoter et al. | |
| 2004/0125479 A1 | 7/2004 | Ehrlich | |
| 2004/0125481 A1 | 7/2004 | Ehrlich | |
| 2004/0125483 A1 | 7/2004 | Ehrlich | |
| 2004/0125484 A1 | 7/2004 | Ehrlich | |
| 2004/0125485 A1 | 7/2004 | Ehrlich | |
| 2005/0013026 A1 | 1/2005 | Ehrlich | |
| 2005/0013027 A1 | 1/2005 | Ehrlich | |
| 2005/0013030 A1 | 1/2005 | Ehrlich | |
| 2005/0013031 A1 | 1/2005 | Ehrlich | |
| 2005/0063087 A1 | 3/2005 | Ehrlich | |
| 2005/0063088 A1 | 3/2005 | Ehrlich | |

* cited by examiner

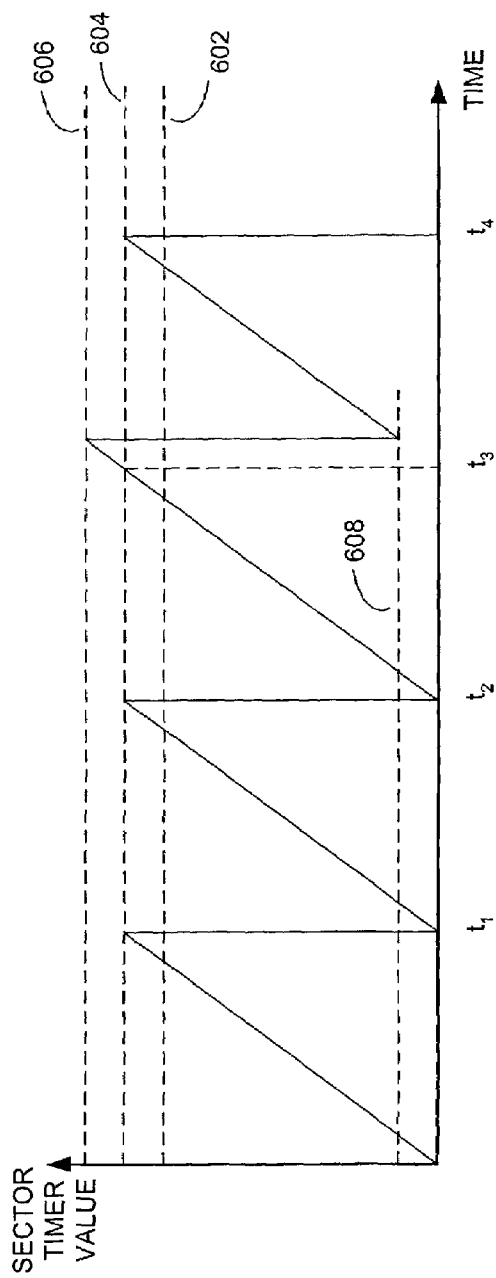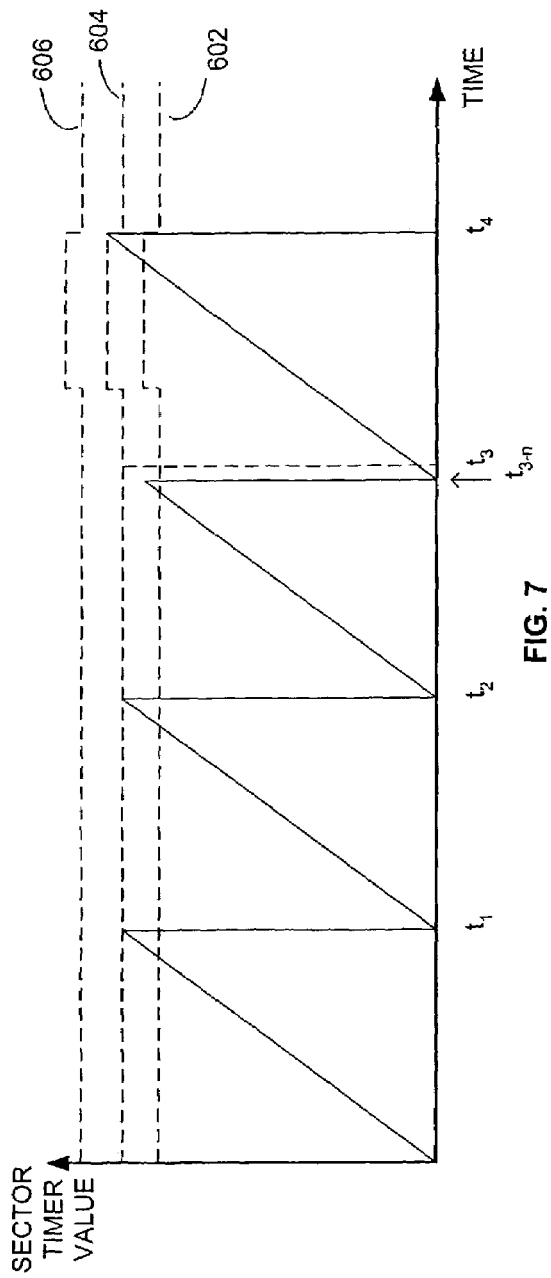

METHODS FOR DETECTING MULTIPLE OCCURRENCES OF A SAM PATTERN TO THEREBY IMPROVE SERVO-DEMODULATION ROBUSTNESS

PRIORITY CLAIM

This application claims priority to U.S. Provisional Patent Application No. 60/436,671, filed Dec. 27, 2002, entitled "Systems for Detecting Multiple Occurrences of a SAM Pattern to thereby Improve Servo-Demodulation Robustness."

CROSS REFERENCE TO RELATED APPLICATIONS

This application relates to the following commonly invented and commonly assigned applications, each of which was filed on the same day as this application: U.S. patent application Ser. No. 10/413,316, entitled "Systems for Improving Servo Demodulation Robustness"; U.S. patent application Ser. No. 10/412,853, entitled "Systems for Detecting Multiple Occurrences of a SAM Pattern to Thereby Improve Servo-Demodulation Robustness"; U.S. patent application Ser. No. 10/413,194, entitled "Systems for Preventing Channel Control Values from being Corrupted to thereby Improve Servo-Demodulation Robustness"; U.S. patent application Ser. No. 10/413,338, entitled "Methods for Improving Servo-Demodulation Robustness"; U.S. patent application Ser. No. 10/413,339, entitled "Methods for Preventing Channel Control Values from being Corrupted to thereby Improve Servo-Demodulation Robustness".

FIELD OF THE INVENTION

This invention relates to disk drives, and more particularly to improving servo demodulation robustness.

BACKGROUND

Disk drives typically include one or more disks that define a multiplicity of concentric data tracks. Head position control systems are typically used to move a transducer (head) from a departure track to a destination track location during track seeking operations, to settle the head at the vicinity of the destination track during track settling operations, and to follow the read or write centerline of the destination track during track following operations when data information is written on or read from the disk.

Servo head position information is typically embedded within servo wedges on a disk, which are usually recorded in evenly spaced apart areas or sectors of a track. The embedded servo wedges includes servo head position and track/data identification fields, and typically include a recognizable servo address mark (SAM) pattern which is provided to resynchronize timers for recovering the servo head position and the track/data identification field information, and which mark in time an expected arrival of the next embedded servo wedge. SAM patterns (often simply referred to hereafter as SAMs), in the past, were intended to be unique from patterns that may appear in data or in other portions of a servo wedge. However, that is no longer the case, and patterns equivalent to a SAM may appear in data or in other parts of a servo wedge. Further, a demodulated signal may include a pattern that resembles a SAM pattern because of noise or flaws on the disk media.

Conventionally, a servo demodulator determines when or where to start searching for a SAM pattern by timing from the most recent SAM that was detected. Typically, the servo demodulator searches for the SAM during a timing window, that is centered a pre-determined (SAM-to-SAM) time after the most recently detected SAM, with a width equal to a specified timing-variation tolerance. If the SAM is not detected within the window, then the timing of the search for the next SAM is determined by "free-wheeling," based upon the last SAM that was actually demodulated. When the next SAM is detected (i.e., the SAM following a missing SAM), the timing circuitry is re-set to begin looking for the following SAM based upon the timing of the SAM just detected. This conventional scheme can typically get though at least one missing SAM, and detect the next SAM (which is hopefully good, and can be detected). However, the servo demodulator may inadvertently detect a SAM pattern in the wrong place. This may occur, for example, because another portion of the servo wedge is substantially identical to the SAM (or due to noise, or media or signal corruption, appears substantially identical to the SAM). If this occurs, the demodulator will begin to search for the next SAM at the wrong time or place. In this manner, a single bad SAM detection could cause the servo demodulator to completely lose lock, adversely affecting the performance of the disk drive. There is a need to decrease, and hopefully prevent, the servo demodulator from losing lock.

BRIEF DESCRIPTION OF THE DRAWINGS

FIG. 6 is a timer value vs. time graph that is useful for explaining freewheeling;

FIG. 7 is a timer value vs. time graph that is useful for explaining embodiments of the present invention where a SAM search window is adjusted;

DETAILED DESCRIPTION

According to embodiments of the present invention, servo demodulator outputs (e.g., SAM patterns, track numbers and/or burst values, etc.) are checked for "sanity." If the demodulation output appears bad (e.g., does not resemble a predicted or expected output), the servo demodulator timing circuitry can be re-programmed to search for the next SAM based upon the timing of a previous (e.g., the most recently detected) SAM pattern detection that met the sanity check. This way, a single bad SAM detection will not cause the servo demodulator to lose lock.

Systems and methods are provided for using servo address mark (SAM) pattern detections to improve servo-demodulation robustness. SAM pattern detections are characterized as either good SAM detections or bad SAM detections. Further servo functions are then based on whether the detection of the SAM pattern in a servo wedge was characterized as a good SAM detection or characterized as a bad SAM detection.

In accordance with embodiments of the present invention, multiple occurrences of the SAM pattern are searched for in a single servo wedge. Each detection of the SAM pattern in the servo wedge is characterized as a good SAM detection or a bad SAM detection. If more than one detection of the SAM pattern in the servo wedge are characterized as good SAM detections, one of the detections is selected as the best good SAM detection. Further servo functions can then be performed based on the best good SAM detection.

In accordance with embodiments of the present invention, the SAM pattern is searched for in a servo wedge. If the SAM pattern is detected in the first servo wedge, one or more channel control values (e.g., servo AGC and/or PLL values) associated with the first servo wedge are stored, and a determination is made whether to characterize the detection of the SAM pattern as either a good SAM detection or a bad SAM detection. If the detection of the SAM pattern is characterized as a good SAM detection, then the just stored channel control values are used as starting values when beginning to read a next servo wedge. However, if the SAM pattern is not detected, or a detection is characterized as bad, one or more previously stored or predicted channel control values are used as starting values when beginning to read the next servo wedge.

Further embodiments, features, aspects, and advantages of the present invention will become more apparent from the additional description set forth below, the drawings and the claims.

Exemplary Disk

Figure 1:
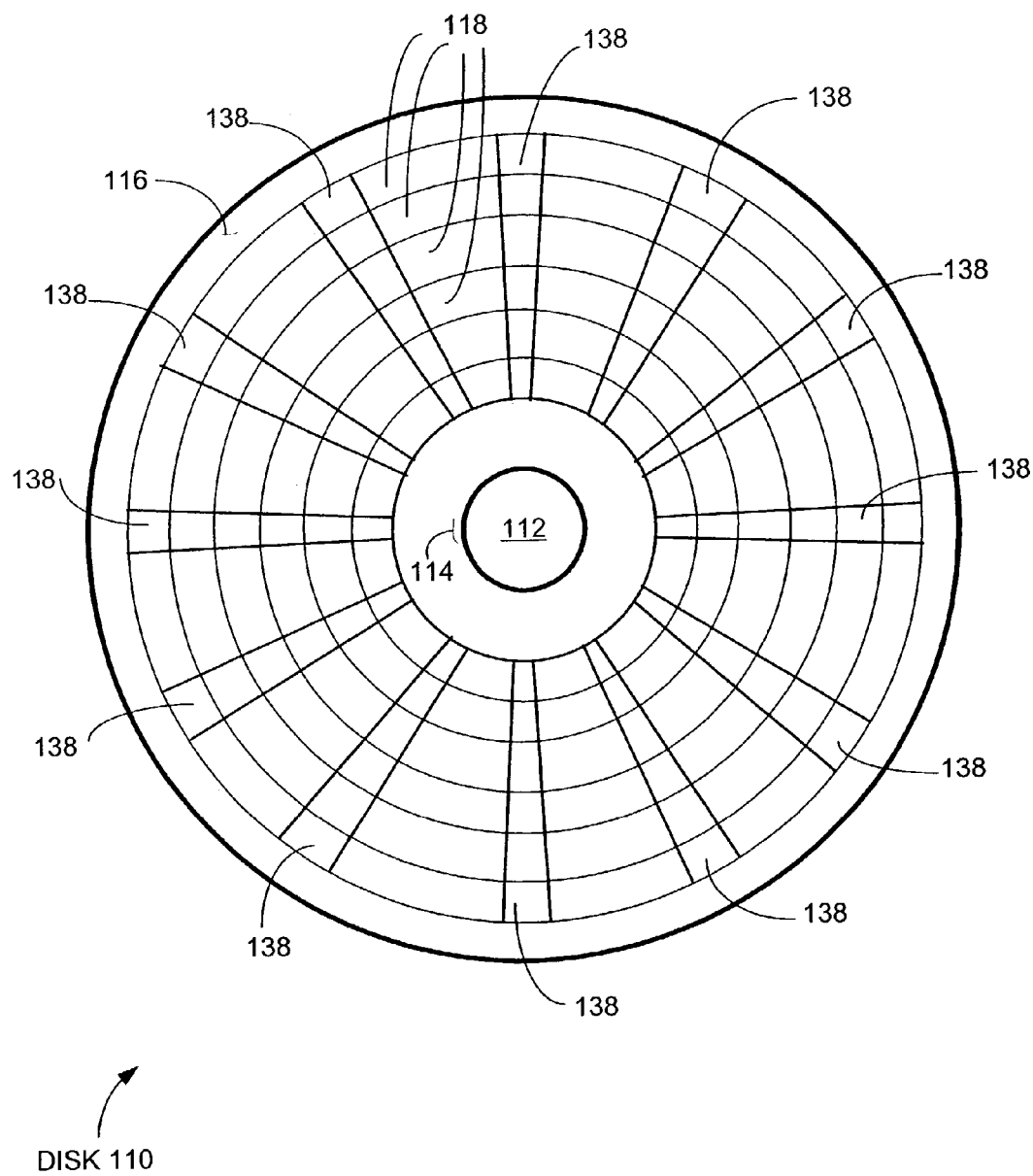
FIG. 1 is a plan view showing exemplary data and servo patterns on a storage disk.

Before describing the various embodiments of the present invention, it is useful to first explain an exemplary disk drive system that stores information on rotatable storage disks. FIG. 1 is a plan view of an exemplary rotatable storage disk 110. The disk 110 includes a central opening 112 to enable a rotating hub to securely clamp the disk to a disk spindle. Between an inner area 114 and an outer peripheral area 116, a data storage area of a multiplicity of concentric data tracks is defined. The tracks are arranged into multiple data zones 118 (also known as data fields or user data fields), from a radially outermost data zone 118 to a radially innermost data zone 118. A system information region and a diagnostics and guard region typically lies near the inner diameter and/or outer diameter of the disk 110, outside the data storage area.

FIG. 1 also depicts a series of radially extending servo sectors 138 (also known as servo fields or servo wedges). The radial servo sectors 138 (shown as several narrow spokes in FIG. 1, but are typically somewhat curved) are typically equally spaced around the circumference of the disk 110. While the number of data sectors in each zone varies, it is apparent from inspection of FIG. 1 that the number of embedded servo wedges 138 remains invariant throughout the extent of the storage surface. As each data sector is of fixed storage capacity or length (e.g. 512 bytes of user data per data sector), and since the density and data rates vary from data zone to data zone, the servo sectors 138 interrupt and split up at least some of the data sectors or fields. The servo sectors 138 are typically recorded with a servo writing apparatus at the factory, but may be written (or partially written) by a self-servowriting operation.

The number and scale of the various data zones 118 and servo wedges 138 shown in FIG. 1 are not precise. For example, there is likely more data zones 118 and servo wedges 138 than shown. Further, the servo wedges 138 likely take up less area on the disk 110 than shown.

Exemplary Servo Wedge

Figure 2:
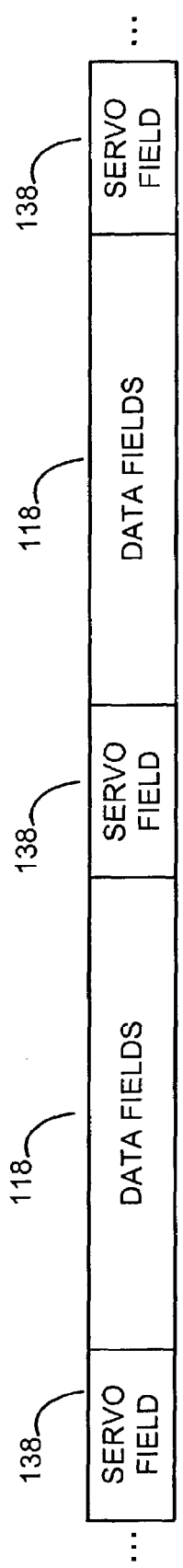
FIG. 2 is an illustration of servo and data fields within a track of the disk shown in FIG. 1.

FIG. 2 illustrates the repeating of servo fields 138 and data fields 118 in a track. Each servo field 138 is physically associated with the immediately following data fields 118, as determined by the direction of rotation of the disk 110 relative to ahead. A plurality of servo fields 138 and data fields 118 are recorded on each track. The number of tracks on each disk is usually relatively high (e.g., greater than two thousand).

Figure 3:
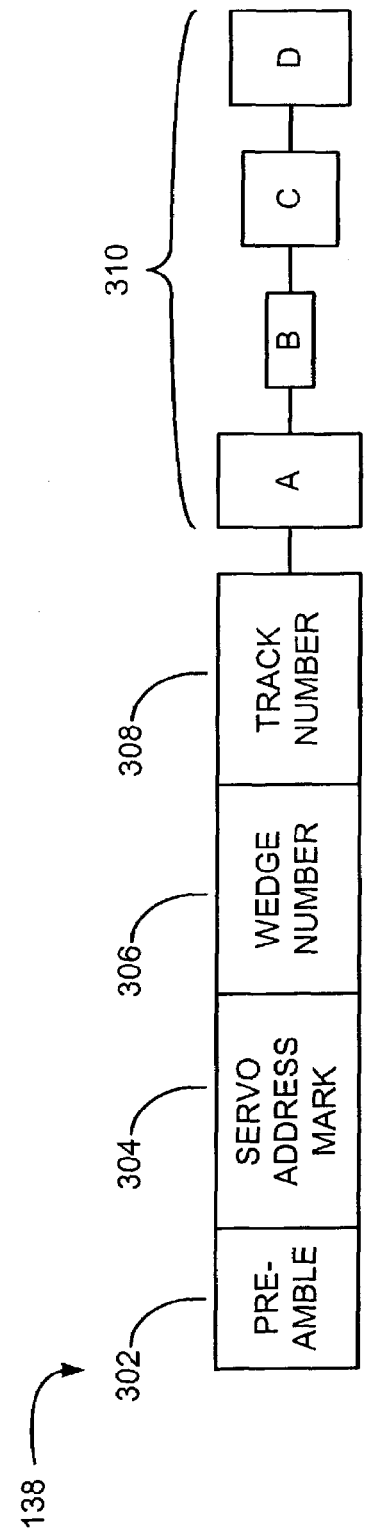
FIG. 3 is an illustration of exemplary subpart fields within a servo field shown in FIG. 2.

Each servo wedge 138 is formed by a number of subpart fields as shown in FIG. 3. Each servo wedge 138 typically includes a preamble 302, a servo address mark ("SAM") 304, a wedge number 306, a track number code 308 and a number of off-track bursts 310, typically four. The order in which these subpart fields occur is sometimes changed. Also, there maybe additional and/or different subpart fields, which are not shown in this example.

The preamble 302 is a series of magnetic transitions which represents the start of the servo field 138. A signal produced while reading the preamble 302 can be used to adjust an automatic gain control (AGC) and/or a phase lock loop (PLL) of a servo demodulator, to allow demodulation of the rest of the servo wedge 138. The SAM 304, which specifies the beginning of available information from the servo wedge 138, is typically used to resynchronize timer(s) for recovering the servo head position and the track/data identification field information, and to mark in time the expected arrival of the next servo wedge 138. It is noted that some disk drive companies refer to the SAM pattern as a servo synchronization mark (SSM). Thus, the term SSM may be substituted for the term SAM, as used herein.

The wedge number 306 (which may simply be an index mark), is used to count the number of servo fields in each track when the disk 110 is rotating. A different wedge number can uniquely identify each servo wedge. Alternatively, if the wedge number is simply an index mark, the wedge number can be, for example, a data bit "one" for an index servo wedge, and a data bit "zero" for all other servo wedges. The term wedge number is also meant to cover other numbers or marks that are used to indicate the rotational position of a disk, relative to a head.

The track number 308, which is usually gray coded, is used for uniquely identifying each track. The off-track bursts 310 (pictorially represented as A, B, C and D) are employed to control the fine positioning of a read/write head relative to the tracks. In general, the subpart fields 302–310 that form the servo wedge 138 contain control information that is used for servo control to achieve proper operation of a head disk assembly (HDA) of a disk drive storage device.

Exemplary Disk Drive Device

Figure 4:
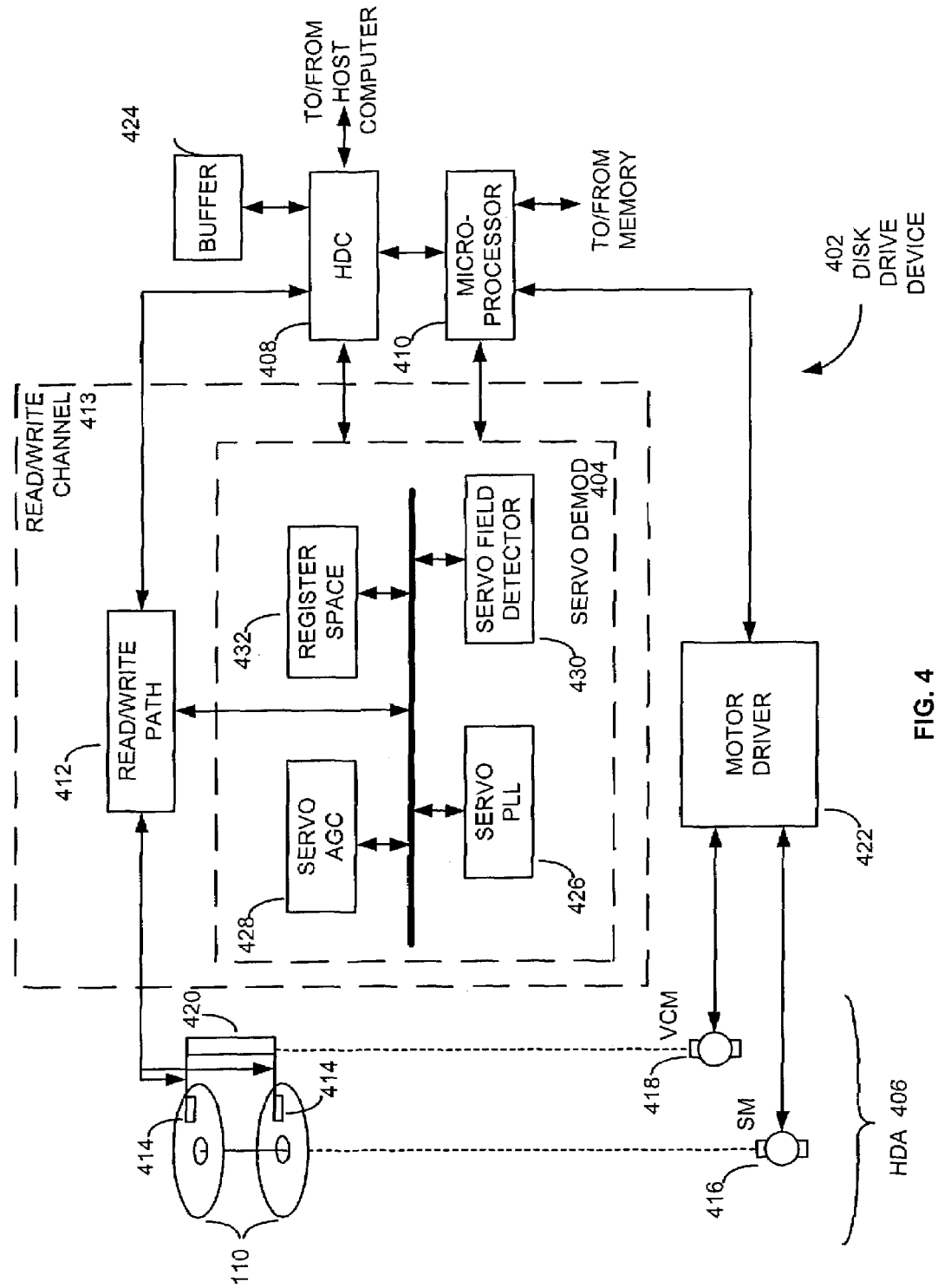
FIG. 4 is a high level diagram of an exemplary disk drive device, which can implement embodiments of the present invention.

FIG. 4 is a high level diagram of an exemplary disk drive storage device 402. Referring to FIG. 4, the disk drive device 402 is shown as including a head disk assembly (HDA) 406, a hard disk controller (HDC) 408, a read/write channel 413, a microprocessor 410, a motor driver 422 and a buffer 424. The read/write channel 413 is shown as including a read/write path 412 and a servo demodulator 404. The read/write path 412, which can be used to read and write user data and servo data, may include front end circuitry useful for servo demodulation. The read/write path 412 may also be used for writing servo information in self-servowriting. Additional details of the read/write path 412 and the servo demodulator 404 are discussed below with reference to FIG. 5. One of ordinary skill in the art will appreciate that the drive 402 includes additional components, which are not shown because they are not necessary to explain the embodiments of the present invention.

The HDA 406 includes one or more disks 110 upon which data and servo information can be written to, or read from, by transducers 414, often referred to as heads 414. A spindle motor (SM) 416 rotates the disks 110 with respect to the heads 414. A voice coil motor (VCM) 418 moves an actuator 420 to position the heads 414 on the disks 110. The motor driver 422 drives the VCM 418 and the SM 416. More specifically, the microprocessor 410, using the motor driver 422, controls the VCM 418 and the actuator 420 to accurately position the heads 414 over the tracks (described with reference to FIGS. 1–3) so that reliable reading and writing of data can be achieved. The servo fields 138, discussed above in the description of FIGS. 1–3, are used for servo control to keep the heads 414 on track and to assist with identifying proper locations on the disks 110 where data is written to or read from. When reading a servo wedge 138, the heads 414 act as sensors that detect the position information in the servo wedges 138, to provide feedback for proper positioning of the heads 414.

Among other functions, the HDC 408 enables the disk drive device 402 to communicate with a host computer (e.g., a personal computer or web server). For example, the HDC 408 may control the transfer of user data (as opposed to servo data) between the read/write path 412 and the host computer. The HDC 404 will most likely use the buffer 424 when performing such transfers. The read/write path 412 includes electronic circuits used in the process of writing and reading information to and from disks 110. The microprocessor 410, which can be a micro-controller, includes firmware that can be used to perform various embodiments of the present invention. The microprocessor 410 can also perform servo control algorithms, and thus, maybe referred to as a servo controller. Alternatively, a separate microprocessor or digital signal processor (not shown) can perform servo control functions.

Figure 5:
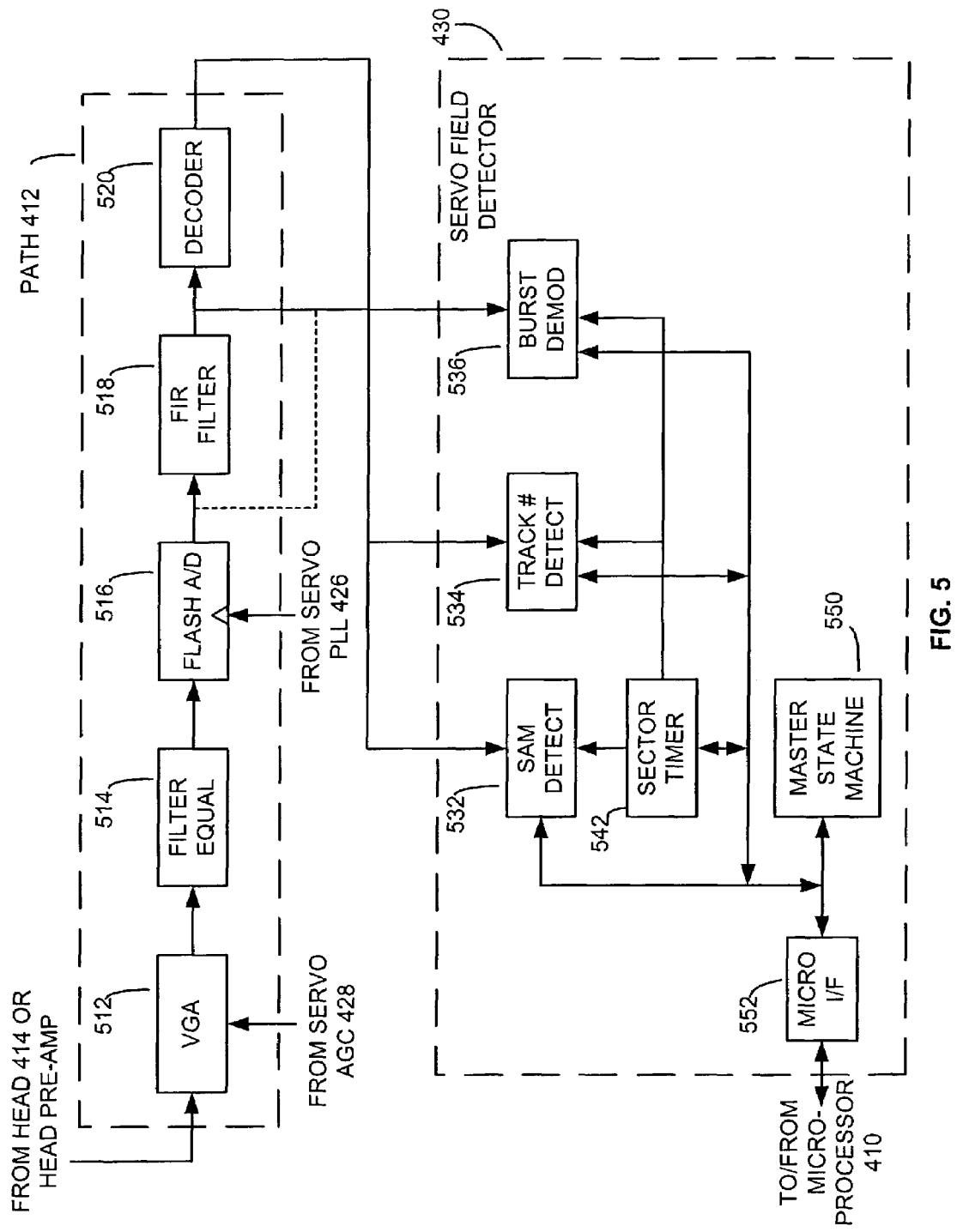
FIG. 5 is a high level diagram showing exemplary portions of the read/write path and the servo field detector of FIG. 4.

The servo demodulator 404 is shown as including a servo phase locked loop (PLL) 426, a servo automatic gain control (AGC) 428, a servo field detector 430 and register space 432. The servo PLL 426, in general, is a control loop that is used to provide frequency and phase control for the one or more timing or clock circuits (not specifically shown in FIG. 4), within the servo demodulator 404. For example, the servo PLL 426 can provide timing signals to the read/write path 412. The servo AGC 428, which includes (or drives) a variable gain amplifier, is used to keep the output of the read/write path 412 at a substantially constant level when servo wedges 138 on one of the disks 110 are being read. The servo field detector 430, which is discussed in more detail with reference to FIG. 5, is used to detect and/or demodulate the various subfields of the servo wedges 138, including the SAM 304, wedge number 306, track number 308 and servo bursts 310. The microprocessor 410 is shown as being separate from the servo demodulator 404. However, because the microprocessor 410 is used to perform various servo demodulation function (e.g., decisions, comparisons, characterization and the like), the microprocessor 410 can be thought of as being part of the servo demodulator 404, or the servo demodulator 404 can have its own microprocessor.

The servo fields 138 are typically written at a different frequency than the interspersed user data fields 118. Because of this, the read/write path 412 will either switch between independent signal paths, or switch characteristics of common processing circuitry. To accomplish this, information for the servo AGC 428 can be stored in registers and/or memory, allowing the information to be updated in the servo AGC 428 each time the read/write path 412 transitions between reading user data and servo data. For example, one or more registers (e.g., in register space 432) can be used to store appropriate servo AGC values (e.g., gain values, filter coefficients, filter accumulation paths, etc.) for when the read/write path 412 is reading servo data, and one or more registers can be used to store appropriate values (e.g., gain values, filter coefficients, filter accumulation paths, etc.) for when the read/write path 412 is reading user data. A control signal can be used to select the appropriate registers according to the current mode of the read/write path 412. The servo AGC value(s) that are stored can be dynamically updated. For example, the stored servo AGC value(s) for use when the read/write path 412 is reading servo data can be updated each time an additional servo wedge 138 is read. In this manner, the servo AGC value(s) determined for a most recently read servo wedge 138 can be the starting servo AGC value(s) when the next servo wedge 138 is read.

In addition to storing servo AGC information, servo PLL information (e.g., a servo PLL frequency) can be stored in registers and/or in memory, allowing the servo PLL information to be dynamically updated. For example, a servo PLL frequency value determined for a most recently read servo wedge 138 can be the starting servo PLL frequency when the next servo wedge 138 is read.

Referring now to FIG. 5, some additional details of an exemplary read/write path 412 and an exemplary servo field detector 430 are shown. Since embodiments of the present invention relate more to read operations, than to write operations, only read portions or the exemplary read/write path 412 are shown. The read portion of path 412 is shown as including a variable gain amplifier (VGA) 512, which receives signals from heads 414, or more likely from a pre-amplifier (not shown) driven by a signal received from heads 414. As mentioned above, the VGA 512 may be external to the read/write path 412. During servo reading, the VGA 512 is at least partially controlled by the servo AGC 428. Additional amplifiers, such as buffer amplifiers and/or one or more additional VGAs may also be present. The path 412 is also shown as including an analog filter/equalizer 514, a flash analog-to-digital (A/D) converter 516, a finite impulse response (FIR) filter 518 and a decoder 520. Alternatively, the FIR filter 518 can be upstream of the A/D converter 516, and FIR filtering can be performed using analog circuitry.

During servo reading, magnetic flux transitions sensed by the selected head 414 are likely preamplified before being provided to the VGA 512, which controls amplification of an analog signal stream. The amplified analog signal stream is then provided to the analog filter/equalizer 514, which can be programmed to be optimized for the data transfer rate of the servo data being read by one of heads 414. The equalized analog signal is then subjected to sampling and quantization by the high speed flash A/D 516 which generates raw digital samples that are provided to the FIR filter 518. Timing for sampling can be provided by the servo PLL 426, as shown. Alternatively, sampling maybe performed asynchronously, e.g., using an asynchronous clock (in which case, most features of the present invention are still useful). The FIR filter 518 filters and conditions the raw digital samples before passing filtered digital samples to the decoder 520. The decoder 520 decodes the digital sample stream and outputs a binary signal. The servo PLL 426 can also provide other timing signals that are necessary for the path 412 and portions of the servo demodulator 404 to operate properly.

The binary signal output is provided to the servo field detector 430, and more specifically to a SAM detector 532 and a track number detector 534 of the servo field detector 430. The output of the FIR filter 518 is provided to a burst demodulator 536. Alternatively, the output of the flash A/D 516 can be provided to the burst demodulator 536. The SAM detector 532 searches for a SAM using, for example, pattern recognition logic that recognizes the SAM pattern within the binary stream. The SAM detector 532 can allow some fault or error tolerance, so that a SAM pattern will be detected even if one or more of the bits in the binary stream do not exactly match the SAM pattern. As a consequence, should minor errors occur in reading or writing the SAM patterns, it may still be possible to fully demodulate the information contained in the servo wedge 138 and to read and write data in the data fields 118 following the servo wedge 138 in which the errors were detected. An exemplary error tolerant SAM detection circuit is disclosed in U.S. Pat. No. 5,477,103 to Romano et al., entitled "Sequence, Timing and Synchronization Technique for Servo System Controller Of A Computer Disk Mass Storage Device," which is incorporated herein by reference. The track number detector 534 performs decoding of gray codes (if necessary) and detects track numbers. The burst demodulator 536 measures burst amplitudes and/or phases. The servo field detector 430 may also include a wedge number detector, not shown. The wedge number detector would detect a wedge number to determine which wedge is being read. The wedge number detector can alternatively detect an index mark type wedge number and determine which wedge is being read based on the number of wedges that have been passed since the index mark was detected.

The exemplary servo field detector 430 is shown as also including a master state machine 550, which generates states providing timing signals and windows for each of the subpart fields 302, 304, 306 and 310 of each servo wedge 138. The master state machine 550 can also supervise operation of various other elements that may be part of the servo field detector 430.

A sector timer 542 can be used for controlling the length of a servo wedge 138, for controlling a SAM search window, and other servo data reader functions including, for example, servo interrupt, servo-data overwrite protection, write to read recovery time and AGC timing. The sector timer 542 is, for example, a 12-bit (or more) upcounting, synchronously loadable counter running at one half of the operating frequency of the servo field detector 430. Each sector timer count can be a clock cycle, which is, for example, 10.0 nanoseconds. Rather than using the sector timer 542 (or in addition to using the sector timer 542), a delay timer (not shown) can be used to perform functions of, or similar to, the sector timer 542. Alternatively, a programmed finite-state machine can be used to perform timing functions (and to perform the functions of the master state machine 550).

One of ordinary skill in the art will appreciate that the path 412 and the servo field detector 430 may include additional components, which are not shown because they are not necessary to explain the embodiments of the present invention.

Searching for SAM Patterns

In accordance with some embodiments of the present invention, when the master state machine 550 (together with the SAM detector 532) detects a servo address mark (SAM), it signals the sector timer 542 causing the present value of the sector timer to be saved (e.g., in register space 432 or memory), and the sector timer 542 to be reset to zero. The value stored, which is known as the SAM-to-SAM value, can be used to determine where/when to search for the next SAM.

The master state machine 550 (together with the SAM detector 532) searches for a next SAM within a search window, defined about an expected value (e.g., defined about a sector timer value where the next SAM is expected to be detected). The expected value can be based, for example, on the most recently detected SAM-to-SAM value, on a group of recently detected SAM-to-SAM values (e.g., based on an average of the previous few SAM-to-SAM values), or based on a nominal or predetermined SAM-to-SAM value. More specifically, the search window can be defined by a STARTSEARCH value (e.g., stored in a STARTSEARCH register) and an ENDSEARCH value (e.g., stored in an ENDSEARCH register).

Free-wheeling

If the master state machine 550 misses detection of a SAM, the sector timer 542 does not get reset and keeps counting upward. When the sector timer 542 reaches the time equal to the ENDSEARCH value, it sends a signal to the master state machine 550, indicating a timeout condition has occurred. At this point, the sector timer 542 loads the value from a TIMESUP load time register, which is the time the sector counter 542 would nominally be at had the SAM been detected at the expected time and the sector timer 542 reset. Loading the TIMESUP load time value into the sector timer 542 enables demodulation of some of the remaining sub-fields of the servo wedge and searching for the next SAM at the correct time/location. The above process, which occurs after missing the detection of a SAM, is often referred to as "free-wheeling."

The concept of free-wheeling can be better appreciated from the Sector Timer Value vs. Time graph shown in FIG. 6. In FIG. 6, a dashed line 602 represents the value of the sector timer 542 that triggers the servo demodulator 404 to begin searching for the SAM. This value is referred to as the STARTSEARCH value, which can be stored in a STARTSEARCH register or in memory. A dashed line 604 represents the value of the sector timer 542 at which the SAM is expected, referred to hereafter as a EXPECTSAM value, which can be stored in an EXPECTSAM register and/or in memory. As mentioned above, the EXPECTSAM value can be a nominal or predetermined value, or it can be dynamic by being based on one or more previous SAM-to-SAM values. A dashed line 606 represents the ENDSEARCH value (i.e., the value of the sector timer 542 that will trigger a timeout), which can be stored in an ENDSEARCH register or in memory. As mentioned above, the STARTSARCH value and the ENDSEARCH value define a search window for the SAM pattern, with the EXPECTSAM value defining the expected time/location of the SAM pattern within the window.

In this example, the SAM is detected at times t1 and t2. However, the SAM is not detected at time t3, and eventually the sector timer value equals the ENDSEARCH value. At this time, the timeout condition has occurred and the sector timer 542 loads the value from the TIMESUP load time register (or from memory), which is represented by dashed line 608. This enabled the next SAM to be detected at time t4. For a more specific example, assume the START-SEARCH value equals 990, the EXPECTSAM value equals 1000, and the ENDSEARCH value equals 1010. The difference between the EXPECTSAM value and the END-SEARCH value in this example equals 10 (i.e., 1010−1000=10), which is the value in the TIMEUP load time register represented by dashed line 608. Once the timeout condition occurs, the sector timer 542 is reset to 10 (instead of zero), enabling the servo field detector 430 to detect the next SAM at time t4.

Deficiencies of Free-wheeling

Free-wheeling provides a way for the servo field detector 430 to detect a next SAM, if a SAM is missed, as explained above. However, free-wheeling does not provide a solution for the situation where another portion of a servo wedge, which is identical to the SAM (or due to noise, or media or signal corruption, appears identical to the SAM), is detected instead of an actual SAM. The detection of another portion of the servo wedge that is identical to the SAM pattern or appears to be the SAM pattern, but is not intended to be the SAM, is referred to herein as a "bad SAM detection." In contrast, the detection of a SAM pattern that is intended to act as a SAM (i.e., written on the disk to function as a SAM), shall be referred to herein as a "good SAM detection." A bad SAM detection may also occur because an error tolerant SAM detection circuit made an incorrect decision.

In a conventional servo demodulator, when a bad SAM detection occurs, the sector timer to is reset to zero. Because the sector timer is reset to zero at the wrong time, the servo field detector will start to search for the next SAM at the wrong time (and thus, at the wrong location on the disk). There is still a chance that the servo field detector will detect a good SAM in the next servo wedge, even if it begins looking at the wrong time/location. However, it is possible that once a bad SAM detection occurs, that the servo demodulator will completely lose lock, requiring the servo demodulator to halt and restart in order to relock the servo signal. Such relocking of the servo signal is time consuming, reducing the performance of the drive. Further, if a bad SAM detection repeatedly occurs at a specific location on a disk, it may make it impossible to retrieve previously written data.

As just explained, a single bad SAM detection can cause the servo demodulator to completely lose lock. Embodiments of the present invention, as described below, reduce the likelyhood, and hopefully prevent, the servo demodulator from losing lock after a bad SAM detection.

A bad servo signal can also cause the servo AGC and/or PLL values that are stored, as explained above, to be corrupted. As explained above, servo AGC and/or PLL values can be stored in registers or memory so that values determined while reading one servo wedge 138 can be used as the starting values for reading a next servo wedge 138. When a servo wedge 138 is corrupted, it is possible that the values determined for servo AGC and servo PLL during that servo wedge 138 are garbage (i.e., corrupted). For example, if the servo wedge 138 was DC erased, the servo AGC 428 may over amplify a very low amplitude servo signal, and may even saturate itself and/or the VGA 512. Similarly, if the servo wedge 138 has been essentially erased, or is absent due to a media defect on the disk 110, the servo PLL may become erratic while attempting to lock to a corrupt servo signal. Thus, a bad servo wedge can also cause the values determined for servo AGC and servo PLL, during that servo wedge, to be garbage (i.e., corrupted). If these garbage values are used as starting values when the next servo wedge 138 is read, it is likely that it will take at least the entire next servo wedge 138 for the servo AGC 428 and the servo PLL 426 to recover (e.g., because the servo AGC 428 is saturated and the servo PLL 426 is erratic), causing the SAM in the next servo wedge 138 to be missed. This in turn can cause the servo demodulator 404 to completely lose lock. When this occurs, the whole concept, of having what is learned from one servo wedge influencing how a next wedge is read, backfires. Embodiments of the present invention, as described below, reduce the likelihood, and hopefully prevent, the servo AGC 428 and the servo PLL 426 from retrieving and using garbage values.

Characterizing a SAM Detection as Good or Bad

As explained above, in a conventional servo demodulation circuit, the sector timer 542 is automatically reset to zero after a good SAM detection or a bad SAM detection. This functionality already exists in many servo demodulators. Some embodiments of the present invention are directed to reducing the probability that this type of demodulator will lose lock after a bad SAM detection. More specifically, these embodiments provide away to overcome the situation where the sector timer 542 is wrongly reset to zero because of a bad SAM detection.

As mentioned above, when the SAM is detected (whether a good or bad detection), the master state machine 550 signals the sector timer 542 to cause the present value of the sector timer 542 to be saved as a SAM-to-SAM value, and the sector timer 542 to be reset to zero. When this occurs, the previous SAM-to-SAM value (e.g., in the SAM-to-SAM time register or memory) is typically written over and the sector timer value is reset to zero, affecting when/where to search for the SAM in the next servo wedge 138.

Conventionally, after the SAM pattern is detected in a servo wedge 138, the servo demodulator 404 determines a wedge number value, a track number value and a burst value. Based on these values, the servo demodulator 404 can determine (e.g., calculate) a position error signal (PES). For example, a PES can be calculated based on a track number value and a burst value (e.g., a burst amplitude value).

In accordance with embodiments of the present invention, future wedge number values, track number values, burst values and/or PES values are predicted. The prediction of a next wedge number value is easily determined based on a previous wedge number value. Prediction of the other servo demodulation values can be determined, for example, using state space estimation. Such state space estimation can be performed, for example, in software and/or firmware (e.g., using the microprocessor 410) that run models to produce predicted values. State space estimation is discussed in various control system books, such as "Digital Control of Dynamic Systems, Second Edition," by Franklin, Powell and Workman, Addison-Wesley Publishing Company, Inc. (1980). Factors taken into account in these predictions can include, for example, previously detected wedge number values, track number values and/or burst values. A value can be predicted for the wedge number, track number, burst value and/or PES, or a range of values can be predicted.

Such a range of values can include either a plurality of different values, or two values that define boundaries.

In accordance with embodiments of the present invention, each detection of the SAM pattern is characterized as a good SAM detection or a bad SAM detection. Such characterizations can be based on comparisons between the actual servo demodulation values and the predicted servo demodulation values. These characterizations may not be completely accurate (i.e., a detection of a pattern intended to be a SAM may be characterized as a bad SAM detection, or a detection of a pattern not intended to be a SAM pattern maybe characterized as a good SAM detection). However, the accuracy of the characterizations can be made very high using the various embodiments discussed below.

In accordance with embodiments of the present invention, if an actual servo demodulation value (e.g., a wedge number value) is substantially equal to (i.e., equal to, or with an allowed tolerance of) a predicted value, a detection of the SAM is characterized as a good SAM detection. In embodiments where a range of servo demodulation values are predicted (e.g., a range of PES values), a detection of the SAM pattern can be characterized as a good SAM detection if an actual servo demodulation value (e.g., an actual PES value) is within the range of predicted values. A plurality of predicted and actual servo demodulation values can be determined for a servo wedge. The plurality of predicted values (or ranges of values) can then be compared to the actual servo demodulation values in order to characterize the SAM detection as a good or a bad SAM detection. Where multiple types of servo demodulation values are being predicted and actually determined, the results of the multiple comparisons performed can be weighted equally, or weighted differently, during characterization. In accordance with embodiments of the present invention, multiple comparisons can be used to produce a confidence value, which can be compared to a confidence threshold, in order to characterize a SAM detection as a good or bad SAM detection.

Alternatively, or additionally, the confidence of one or more specific values (e.g., a track number value or a wedge number value) and/or the confidence for a SAM detection can be determined, and these confidence determination(s) can be included in the good/bad SAM detection characterizations. Such confidence determinations can be based, for example, on the number of matched (or mis-matched) bits in a pattern just read.

Confidence determinations can alternatively, or additionally, be based on amplitudes of servo signal samples that make up a detected SAM pattern. For example, demodulated bits can be characterized as low confidence or high confidence bits, and the occurrence of low confidence bits (and/or high confidence bits) can be factored into the good/bad SAM detection characterization. U.S. Pat. No. 5,862,005 to Leis et al., entitled Synchronous detection of wide bi-phase coded servo information for disk drive," and U.S. Pat. No. 5,384,671 to Fisher, entitled, "PRML sampled data channel synchronous servo detector," which are incorporated herein by reference, discuss exemplary schemes that can be used for specifying the confidence of bits.

As explained above, in the discussion of FIG. 6, the servo demodulator 404 has access to an EXPECTSAM value, which was represented by dashed line 604. As mentioned above, the EXPECTSAM value can be a nominal or predetermined value, or it can be dynamic by being based on one or more previous SAM-to-SAM values. If dynamic, the dashed line 604 may not be as straight or horizontal as shown in FIG. 6. In accordance with an embodiment of the present invention, the extent that an actual SAM-to-SAM value (associated with a detected SAM pattern) differs from the EXPECTSAM value is used as a factor when characterizing a SAM detection as a good or a bad SAM detection. For example, a determination, that the difference between the present SAM-to-SAM value and the EXPECTSAM value is greater than a threshold, can be used when characterizing a SAM pattern detection as a bad or a good SAM detection. More specifically, the determination that the difference between the actual SAM-to-SAM value and the EXPECTSAM value is greater than a threshold, can be used together with a comparison(s) between predicted and actual values for the PES, wedge number value, track number value, burst value and/or quality value(s) when characterizing a detection of the SAM pattern as a good or a bad SAM detection. These various factors can be weighted equally, or differently, as desired.

Assuming a SAM detection is characterized as a good SAM detection, the servo demodulator 404 searches for the SAM pattern in the next servo wedge 138 as it normally would. However, if a SAM detection is characterized as a bad SAM detection, then embodiments of the present invention provide a way to overcome the situation where the sector timer 542 is wrongly reset to zero (which will cause the servo demodulator 404 to search for the next SAM at the wrong time/location). More generally, the present invention can be used to help prevent the servo demodulator 404 from losing lock after a bad SAM detection.

Performing Servo Functions Based on Whether a Detection of the SAM Pattern is Characterized as a Good or a Bad SAM Detection The Sector Timer Value vs. Time graph of FIG. 7 will now be used to help explain how embodiments of the present invention can prevent the servo demodulator 404 from losing lock after a bad SAM detection. In FIG. 7, as in FIG. 6, dashed line 602 represents the value of the sector timer 542 that triggers the SAM detector 532 to begin searching for a SAM (e.g., the STARTSEARCH value), dashed line 604 represents the value of the sector time at which the SAM is expected (e.g., the EXPECTSAM value), and dashed line 606 represents the ENDSEARCH value (i.e., the value of the sector timer 542 that will trigger a timeout condition).

In this example, the SAM pattern is detected at times t1 and t2 (assume these are good SAM detections). Additionally, the SAM pattern is detected at time t3−n, which is earlier than the next expected SAM time t3. As explained above and as shown in FIG. 7, conventionally the sector timer 542 is automatically reset to zero at time t3−n, whether a good SAM detection or a bad SAM detection occurred at time t3−n. Conventionally, this will cause the servo demodulator 404 to start searching for the next SAM at an earlier than appropriate time/location (because the sector timer 542 was reset to zero earlier than appropriate). Additionally, the time/location of the next EXPECTSAM and ENDSEARCH will be adversely effected. This may result in another bad SAM detection, or missing the next SAM, in turn resulting in the servo demodulator 404 losing lock.

Now, assume that an embodiment of the present invention, as described above, is used to characterize the detection of the SAM pattern at time t3−n as a bad SAM detection. In accordance with an embodiment of the present invention, the SAM pattern in the next servo wedge 138 will be searched for based on when/where the previous SAM pattern, that was characterized as a good SAM detection, was detected. In this example the sector timer 542 was already reset to zero, and has begun counting. The searching for the next SAM based on a time/location of a detected SAM pattern, characterized as a good SAM detection, is accomplished by beginning to search for the next SAM pattern at a later time/location. For example, assume that the stored STARTSEARCH value equals 990, the stored EXPECTSAM value equals 1000, and the stored ENDSEARCH value equals 1010. Also assume the SAM pattern characterized as a bad SAM detection was detected when the sector timer value was 992, and that the previous SAM pattern, characterized as a good SAM detection, was detected when the sector timer value was 1000. Thus, the bad SAM detection in this example occurred 8 sector timer counts earlier than the EXPECTSAM value. As just mentioned, one of the embodiments of the present invention, described above, is used to characterize the current SAM detection as a bad SAM. In accordance with an embodiment of the present invention, to correct for the bad SAM detection, the value in the STARTSEARCH register is temporarily set to equal 998 (i.e., 990+8=998), the value in the EXPECTSAM register is temporarily set to 1008 (i.e., 1000+8=1008), and the value in the TIMESEUP timeout register is temporarily set to 1018 (i.e., 1010+8=1008). If some of these values were stored in memory locations, they can be temporarily changed in memory. More generally, where/when to search for the next SAM is adjusted so that the search for the next SAM is based on the most recently detected good SAM(s), rather than being based on the detection characterized as a bad SAM. In this example, this enables the servo demodulator 404 to perform a good SAM detection at time t4, at which point the STARTSEARCH, EXPECTSAM and ENDSEARCH values are reset or returned to what they were at time t2, and the servo demodulator 404 maintains servo lock. More specifically, when the SAM pattern is detected (e.g., at time t4), and characterized as a good SAM detection, as a result of temporarily adjusting values (e.g., the values in the STARTSEARCH register, the EXPECTSAM register and the ENDSEARCH register, as explained above) these values are returned to their previous values (e.g., by subtracting 8 counts from each value or replacing the values with stored values).

In a similar manner, the present invention can be used to begin to search for the SAM pattern in the next servo wedge 138 at an earlier time/location, if a bad SAM detection occurs when the sector timer value is between the EXPECTSAM value and the ENDSEARCH value (but did not reach the ENDSEARCH value, which would cause free-wheeling).

Figure 8:
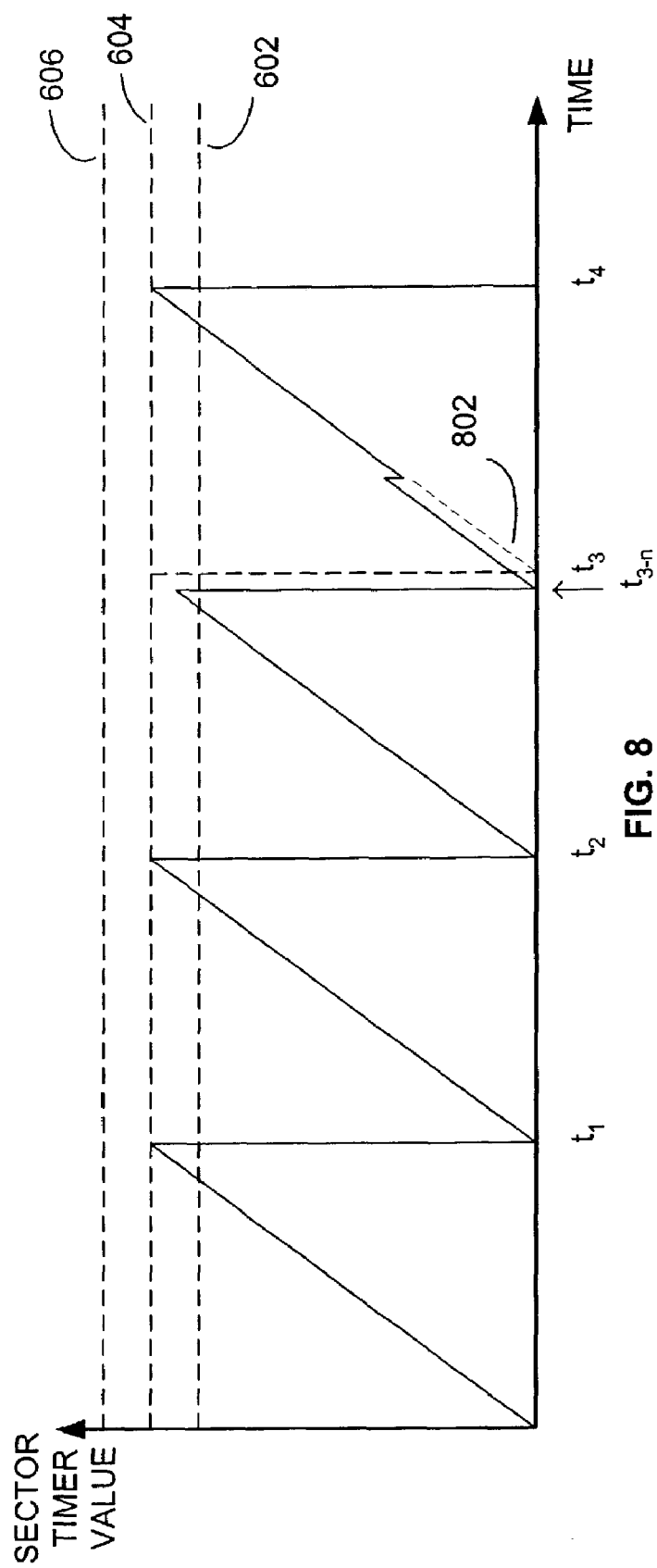
FIG. 8 is a timer value vs. time graph that is useful for explaining embodiments of the present invention wherein a timer is adjusted.

In accordance with other embodiments of the present invention, rather than adjusting values such as the STARTSEARCH, EXPECTSAM and ENDSEARCH values, a timer (e.g., sector timer or delay timer) is appropriately adjusted so that the search window for the next SAM pattern is effectively adjusted. This will now be described with reference to the Sector Timer Value vs. Time graph of FIG. 8. As in FIGS. 6 and 7, dashed line 602 represents the value of the sector timer 542 that triggers the SAM detector 532 to begin searching for a SAM (e.g., the STARTSEARCH value), dashed line 604 represents the value of the sector time at which the SAM is expected (e.g., the EXPECTSAM value), and dashed line 606 represents the ENDSEARCH value (i.e., the value of the sector timer 542 that will trigger a timeout condition).

In this example, the SAM pattern is detected at times t1 and t2 (assume these are good SAM detections). Additionally, the SAM pattern is detected at time t3−n, which is earlier than the next expected SAM time t3. As explained above and as shown in FIG. 8, conventionally the sector timer 542 is automatically reset to zero at time t3−n, whether a good SAM detection or a bad SAM detection occurred at time t3−n. Conventionally, this will cause the servo demodulator 404 to start searching for the next SAM at an earlier than appropriate time/location (because the sector timer 542 was reset to zero earlier than appropriate), which may result in another bad SAM detection, or missing the next SAM, in turn resulting in the servo demodulator 404 losing lock.

Now, assume that an embodiment of the present invention, as described above, is used to characterize the detection of the SAM pattern at time t3−n as a bad SAM detection. In accordance with an embodiment of the present invention, the SAM pattern in the next servo wedge 138 will be searched for based on when/where the previous SAM pattern was detected, which was characterized as a good SAM detection. Since in this example the sector timer 542 was already reset to zero, and has began counting, the searching for the next SAM based on a previous SAM detection (characterized as a good SAM detection) is accomplished by adjusting a timer (e.g., sector timer or delay timer). For example, assume that the stored STARTSEARCH value equals 990, the stored EXPECTSAM value equals 1000, and the stored ENDSEARCH value equals 1010. Also assume the SAM pattern, characterized as a bad SAM detection was detected when the sector timer value was 992, and that the previous SAM detection (characterized as a good SAM detection) occurred when the sector timer value was 1000. Thus, the bad SAM detection in this example occurred 8 sector timer counts earlier than the EXPECTSAM value (and thus the sector timer was reset 8 counts too early, and is therefore 8 counts greater than it should be). As just mentioned, one of the embodiments of the present invention, described above, is used to characterize the SAM detection at time t3−n as a bad SAM detection. In accordance with an embodiment of the present invention, to correct for the bad SAM detection, the value of the sector timer is adjusted (in this example, reduced by 8 counts) so that the bad SAM detection does not adversely affect the SAM search window. More generally, where/when to search for the next SAM is adjusted, by adjusting the timer, so that the search for the next SAM is based on the most recently detected SAM(s) that was characterized as a good SAM detection, rather than being based on the bad SAM. In this example, this enables the servo demodulator 404 to perform a good SAM detection at time t4, and the servo demodulator 404 maintains servo lock. In other words, in this example the timer is adjusted so that it is equal to what it would have been had the SAM pattern been detected at time t3 (in which case the timer would have been following dashed line 802).

In a similar manner, the present invention can be used to upwardly adjust the timer (i.e., to add counts to the timer), if a bad SAM detection occurs when the sector timer value is between the EXPECTSAM value and the ENDSEARCH value (but did not reach the ENDSEARCH value, which would cause free-wheeling).

Features of the embodiments of the present invention can be implemented primarily in software and/or in firmware (e.g., RAM, ROM, PROM and/or EPROM), or in combinations thereof. For example, where embodiments of the invention are to be used with an existing servo demodulator 404, firmware can be programmed to characterize a detected SAM pattern as either a good or a bad SAM detection, to adjust values used to search for the SAM pattern (e.g., the values in the STARTSEARCH register, the EXPECTSAM register and the ENDSEARCH register, or in memory as explained above), and/or to only update other control values (e.g., servo AGC and/or PLL values) following a good SAM detection. Firmware can also be programmed to overwrite erroneously updated servo AGC and/or PLL values with more appropriate previously determined values, in accordance with embodiment of the present invention.

Embodiment of the present invention can also be implemented primarily in hardware. As mentioned above, STARTSEARCH, EXPECTSAM, ENDSEARCH and TIMESUP load time values can be stored in registers. When a SAM detection is characterized as a bad SAM detection, the master state machine 532 or microprocessor 410 can write a specified bit (e.g., a zero) to a predetermined register. In accordance with an embodiment of the present invention, writing the specified bit to the predetermined register will cause the values in the STARTSEARCH and ENDSEARCH registers to be adjusted by an ADJUST value. According to an embodiment of the preset invention, the ADJUST value is equal to the actual SAM-to-SAM value (i.e., the value of the sector timer 542 when the SAM characterized as being bad was detected) minus the stored EXPECTSAM value. Prior to the bad SAM detection, assume the STARTSEARCH value (i.e., the value the in the STARTSEARCH register) is 990, the EXPECTSAM value is 1000, and the ENDSEARCH value is 1010. Also assume, for this example, that the SAM-to-SAM value is 993 when the SAM characterized as being bad is detected (i.e., the value of the sector timer 542 is 993 when the SAM characterized as being bad was detected), thereby causing the ADJUST value to equal −7 (i.e., 993−1000=−7). After the values in the STARTSEARCH and ENDSEARCH registers are adjusted by −7, the STARTSEARCH value becomes 997 (i.e., 990−−7=997) and the ENDSEARCH value becomes 1017 (i. e., 1010−−7=1017). In another example, assume that the SAM-to-SAM value is 1005 when the SAM characterized as being bad is detected. This will cause the ADJUST value to equal 5 (i.e., 1005−1000=5). After the values in the STARTSEARCH and ENDSEARCH registers are adjusted by 5, the STARTSEARCH value becomes 985 (i.e., 990−5=985) and the ENDSEARCH value becomes 1005 (i.e., 1010−5=1005). Such adjustments to the STARTSEARCH and ENDSEARCH registers will assist the servo demodulator 404 with performing a good SAM detection in the next servo wedge 138, even though a bad SAM detection occurred in the current servo wedge 138.

In accordance with another embodiment of the present invention, STARTSEARCH, EXPECTSAM, ENDSEARCH and TIMESUP load time values can be stored in memory. Then, writing a specified bit to the predetermined location in memory will cause the values in the STARTSEARCH and ENDSEARCH registers to be adjusted by an ADJUST value, in a manner similar to that just explained above.

Figure 9:
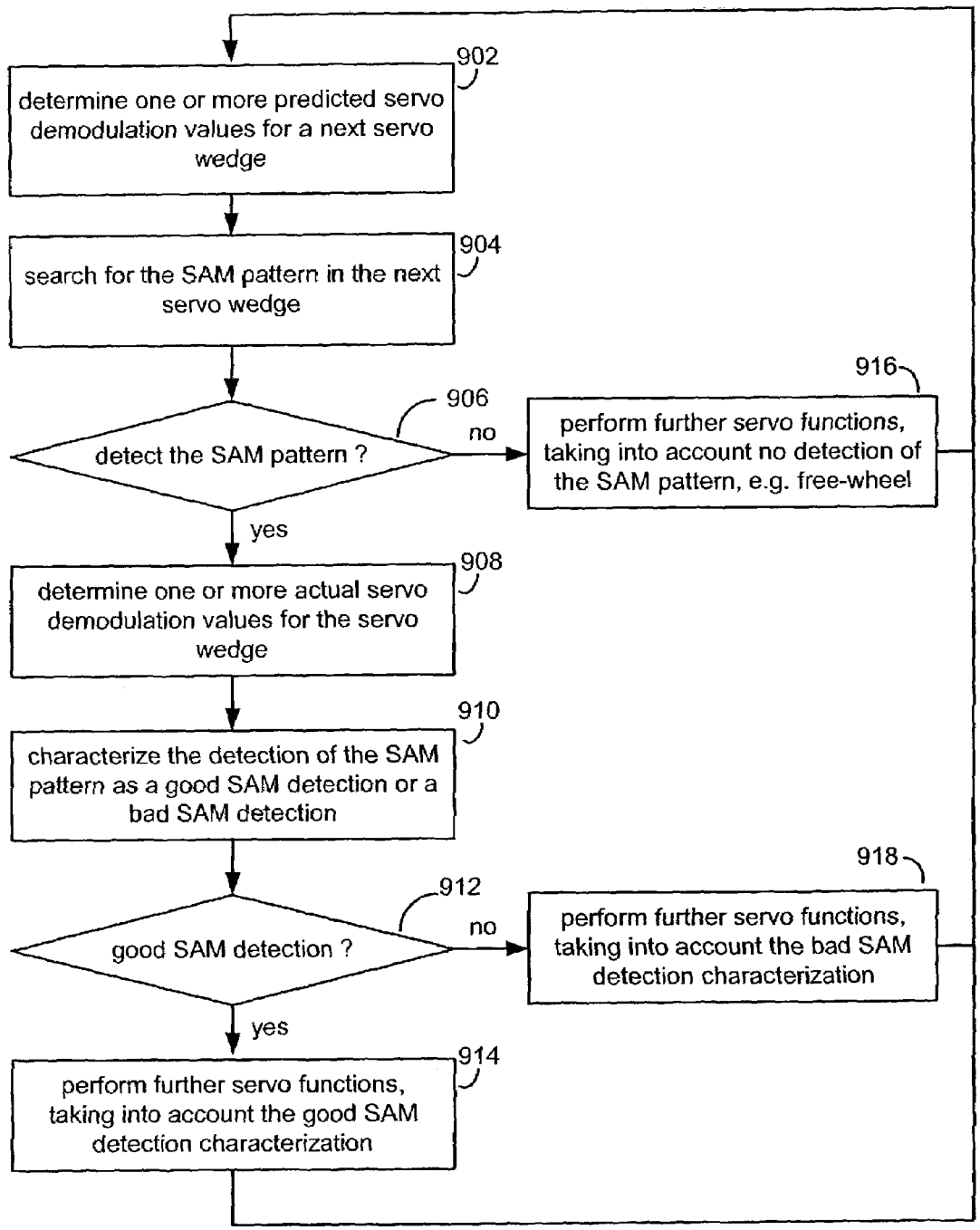
FIG. 9 is a high level flow diagram that summarizes various embodiments of the present invention in which a detection of a SAM pattern is characterized as a good or a bad SAM detection.

Many embodiments of the present invention, discussed above, can be summarized in the flow chart of FIG. 9. Referring to FIG. 9, at a step 902, one or more predicted servo demodulation values are determined for a next servo wedge. For example, the one or more predicted servo demodulation values can include one, a plurality, or a range of wedge number, track number, burst amplitude, and/or PES value(s).

At a step 904, the SAM pattern is searched for in the next servo wedge. If the SAM pattern is not detected in the servo wedge (i.e., if the answer to the decision 906 is no), then further servo functions are performed taking into account no SAM detection, as specified at a step 916. This can include, for example, free-wheeling to attempt to detect the SAM pattern in the following servo wedge. This can also include halting reading data from and writing data to data fields that follow the servo wedge. This can further include, using the one or more predicted servo demodulation values for servo control.

If the SAM pattern is detected in the servo wedge (i.e., if the answer to decision 906 is yes), then one or more actual servo demodulation values are determined for the servo wedge, at a step 908. Then, at a step 910, the detection of the SAM pattern is characterized as a good SAM detection or a bad SAM detection. As explained above, this can be accomplished by comparing the actual servo demodulation value(s) to the predicted servo demodulation value(s). Alternatively, or additionally, other factors, such as the extent that an actual SAM-to-SAM value (associated with a detected SAM pattern) differs from an EXPECTSAM value, and/or confidence determinations, can be used to characterize a detection of the SAM pattern as a good or a bad SAM detection.

If the detection of the SAM pattern is characterized as a bad SAM detection (i.e., if the answer to decision 912 is no), then further servo functions are performed, taking into account the bad SAM detection characterization, as specified at a step 918. For example, this can include halting reading data from and writing data to data fields that follow the servo wedge. This can also include, using the one or more predicted servo demodulation values for servo control, since the actual servo demodulation values are likely garbage. Additionally, where or when to search for the SAM pattern in the following servo wedge can be appropriately adjusted, as explained in detail above.

If the detection of the SAM pattern is characterized as a good SAM detection (i.e., if the answer to decision 912 is yes), then further servo functions are performed, taking into account the good SAM detection characterization, as specified at a step 914. For example, this can include reading data from and writing data to data fields that follow the servo wedge. This can also include, using the one or more actual servo demodulation values for servo control, since the actual servo demodulation values are likely good. Additionally, where or when to search for the SAM pattern in the following servo wedge can be based on where or when the SAM pattern was just detected (e.g., the center of the next SAM search window can be based on the just determined SAM-to-SAM time).

Searching for more than One Occurrence of the SAM Pattern in a Single Servo Wedge Conventionally, if a bad SAM detection occurs within a servo wedge 138, a servo demodulator will not perform a good SAM detection within that same servo wedge, even if a good SAM pattern exists later within that same servo wedge. For example, if a servo demodulator performs a bad SAM detection near the beginning of a search window, a conventional servo demodulator will not detect a good SAM pattern that is also present in the servo wedge. This is because conventional servo demodulators do not search for more than one SAM pattern within a single servo wedge. Embodiments of the present invention, as described below, search for more than one SAM pattern within a single servo wedge, and select which SAM detection (if any) is a good SAM detection. In this manner, further servo functions (e.g., servo control) can be performed using servo demodulation values associated with a good SAM detection (or a best good SAM detection, if there is more than one good SAM detection).

In accordance with embodiments of the present invention, portions of the servo demodulator 404 (or the entire servo demodulator 404, or portions of or the entire servo demodulator 404 and portions of the read/write path 412) are duplicated so that more than one SAM pattern can be searched for within a single servo wedge. For example, two servo field detectors 430 (each including a SAM detector 532) can each search for the SAM pattern within a single servo wedge. When the first servo field detector 430 detects the SAM pattern, the second servo field detector 430 will suppress or ignore that the SAM pattern was detected and will continue to search for the SAM pattern in the remaining portion of the servo wedge (as defined by the remaining portion of the search window). If the second servo field detector 430 also detects the SAM pattern, a determination is made as to which SAM detection (if any) is a good SAM detection. If both SAM detections are characterized as a good SAM detection, then a best good SAM detection can be selected, as described below.

If no SAM detection is characterized as a good SAM detection, then the SAM pattern in the next servo wedge 138 can be searched for based on the one or more previous characterized good SAM detections. Additionally, if no SAM detection is characterized as a good SAM detection (or if there is no SAM detection at all within a servo wedge 138), then the microprocessor 410 can use predicted servo demodulation values for servo control (e.g., for control of the VCM 418).

Embodiments of the present invention are not meant to be limited to searching for only two of the SAM patterns within a single servo wedge. For example, further servo field detectors 430 can be provided to search for additional occurrences of the SAM pattern within a single servo wedge.

Servo demodulation values (e.g., a track number value, a wedge number value, a burst value and/or a PES value) can be determined for each SAM pattern detected within a servo wedge 138. Then, each SAM pattern detection can be characterized as a good SAM detection or a bad SAM detection. If only one good SAM detection occurs in the servo wedge 138, the servo demodulation values associated with the good SAM detection are used for servo control (e.g., used in servo control algorithms). Additionally, where or when to search for the SAM pattern in the next servo wedge 138 is based on when/where the one good SAM detection occurred.

If more than one good SAM detection occurs in the servo wedge 138, then a "best" good SAM detection can be selected. Selection of the best good SAM detection can be based on which SAM detection corresponds to one or more actual servo demodulation values that are closest to one or more predicted servo demodulation values. The servo demodulation values associated with the best good SAM detection can be used for servo control (e.g., used in servo control algorithms). In summary, the one or more actual servo demodulation values associated with the best good SAM detection (or the only good SAM detection) are used for servo control (e.g., for control of the VCM 418). If there is no good SAM detection (or no SAM detection at all), the one or more predicted servo demodulation values can be for servo control.

In accordance with other embodiments of the present invention, the servo demodulator 404 searches for more than one SAM pattern in a single servo wedge 138 without duplicated portions of the servo demodulator 404 (or minimizing the portions that are duplicated). For example, a single servo field detector 430 (including a single SAM detector 532) can search for multiple occurrences of the SAM pattern within a single servo wedge 138. Each time the SAM detector 532 detects the SAM pattern in a servo wedge 138, it informs the microprocessor 410 and/or master state machine 532 of the detection, and continues to search for additional occurrences of the SAM pattern. Each time the SAM detector 532 detects the SAM pattern, the track number detector 534 and burst demodulator 536 generate servo demodulation values that correspond to the detected SAM pattern. The microprocessor 410 can keep track of the multiple SAM pattern detections and corresponding servo demodulation values (which may be stored in registers or memory), and then select which SAM detection (if any) is a good (or best good) SAM detection. The microprocessor 410 can then use the appropriate servo demodulation values (whether actual or predicted) for servo control. Further, the microprocessor 410 can appropriately adjust the SAM search window for the next servo wedge 138 (e.g., by adjusting STARTSEARCH and ENDSEARCH values) based on a good (or a best good) SAM detection, or based on a previous good SAM detection if there is no SAM detection or no good SAM detection for the current servo wedge.

In accordance with embodiments of the present invention, the servo subpart field following a detected SAM pattern (e.g., the wedge number field) is immediately demodulated and compared to one or more predicted values to characterize the SAM detection as a good or a bad SAM detection. As soon as the detection is determined to be a bad SAM detection, no additional demodulation associated with that SAM detection occurs. This increases the efficiency of demodulator and microprocessor resources.

In accordance with embodiment of the present invention, servo demodulation values are only stored in registers if they correspond to a SAM pattern detection that is characterized as a good SAM detection. This enables more efficient use of register space. However, in alternative embodiments servo demodulation values are stored prior to SAM detections being characterized as good or bad detections. Then, decisions of whether or not to use the stored servo demodulations values are made based on the characterizations of the SAM detections.

Figure 10:
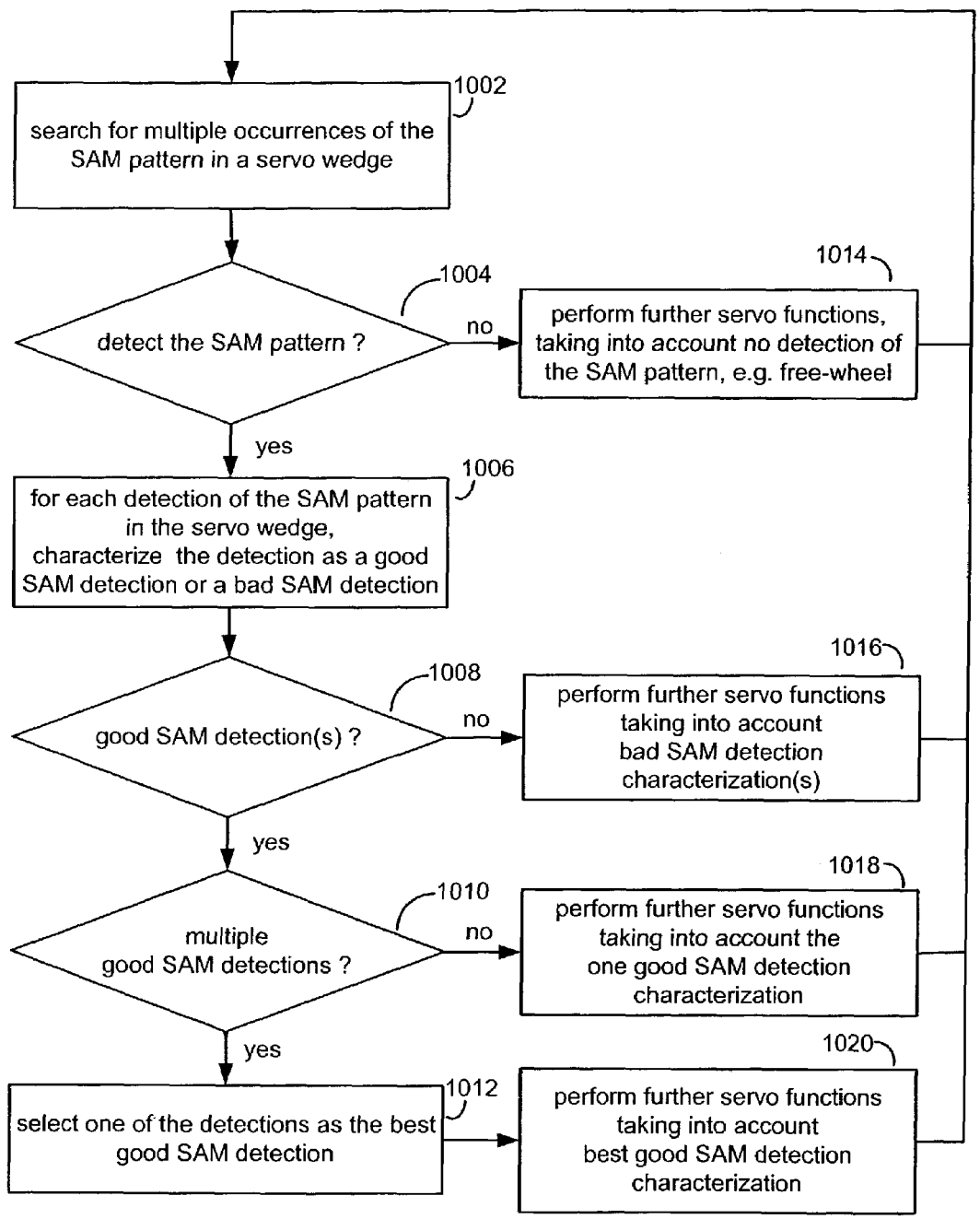
FIG. 10 is a high level flow diagram that summarizes various embodiments of the present invention that search for multiple occurrences of a SAM pattern in a single servo wedge.

Many embodiment of the present invention, discussed above, can be summarized in the flow chart of FIG. 10. Referring to FIG. 10, at a step 1002, multiple occurrences of the SAM pattern are searched for in a servo wedge. As explained above, the servo demodulator 404 can include duplicated portions (e.g., two servo field detectors 430) to perform this step. Alternatively, the servo demodulator 404 can search for multiple occurrences of the SAM pattern, without needing duplicated portions.

If the SAM pattern is not detected in the servo wedge (i.e., if the answer to decision 1004 is no), the further servo functions are performed, taking into account no detection of the SAM pattern. This can include, for example, freewheeling to attempt to detect the SAM pattern in the following servo wedge. This can also include halting reading data from and writing data to data fields that follow the servo wedge. This can further include, using the one or more predicted servo demodulation values for servo control.

Each detection of the SAM pattern is characterized as a good SAM detection or a bad SAM detection, at a step 1006. Various embodiments of the present invention, described above, can be used to perform these characterizations. For example, this can be accomplished by comparing one or more actual servo demodulation value(s) to one or more predicted servo demodulation value(s). Alternatively, or additionally, other factors, such as the extent that an actual SAM-to-SAM value (associated with a detected SAM pattern) differs from an EXPECTSAM value, and/or confidence determinations, can be used to characterize each detection of the SAM pattern as a good or a bad SAM detection.

If no detection of the SAM pattern is characterized as a good SAM detection (i.e., if the answer to decision 1008 is no), then further servo function are performed, taking into account a bad SAM detection(s) characterization(s), as specified at a step 1016 For example, this can include halting reading data from and writing data to data fields that follow the servo wedge. This can also include, using one or more predicted servo demodulation values for servo control, since the actual servo demodulation values are likely garbage. Additionally, where or when to search for the SAM pattern in the following servo wedge can be appropriately adjusted, as explained in detail above.

If only one detection of the SAM pattern is characterized as a good SAM detection (i.e., if the answer to decision 1010 is no), then further servo function are performed, taking into account the one good SAM detection characterization, as specified at a step 1018. For example, this can include reading data from and writing data to data fields that follow the servo wedge. This can also include, using the one or more actual servo demodulation values for servo control, since the actual servo demodulation values are likely good. Additionally, where or when to search for the SAM pattern in the following servo wedge can be based on where or when the SAM pattern was just detected (e.g., the center of the next SAM search window can be based on the just determined SAM-to-SAM time).

If multiple detections of the SAM pattern are characterized as good SAM detections (i.e., if the answer to decision 1010 is yes), then one of the detections is selected as a best good SAM detection, at a step 1012. As explained above, selection of the best good SAM detection can be based on which SAM detection corresponds to one or more actual servo demodulation values that are closest to one or more predicted servo demodulation values.

After one of the SAM detections is selected as a best good SAM detection, further servo functions are performed, taking into account the best good SAM detection characterization, as specified at a step 1020. For example, the servo demodulation values associated with the best good SAM detection can be used for servo control (e.g., used in servo control algorithms). Additionally, where or when to search for the SAM pattern in the following servo wedge can be based on where or when the SAM pattern (characterized as the best good SAM pattern) was just detected. In accordance with an embodiment, data can be written to and/or read from data fields that follow the servo wedge. In an alternative embodiment, the fact the two occurrences of the SAM pattern were characterized as good SAM detections can indicate that there is not enough confidence to write to and/or read from data fields that follow the servo wedge. In still another embodiment, if the two good SAM detections are too closely matched (i.e., one is not much better than the other), then there is not enough confidence to write to and/or read from data fields that follow the servo wedge. However, if one of the good SAM detection is much better (e.g., the SAM detection is associated with actual demodulation values much closer to the predicted values), then data can be written to and/or read from data fields that follow the servo wedge.

Correcting PLL and/AGC Values after a Bad or Missed SAM Detection

As discussed above, a bad servo signal (e.g., caused by a single bad servo wedge 138) can cause the servo AGC and/or PLL values that are stored in registers or memory, to be corrupted. As also explained above, servo AGC and/or PLL values are stored so that values determined while reading one servo wedge 138 can be used as the starting values for reading a next servo wedge 138. Alternatively, servo AGC and/or PLL values that are determined and stored from one servo wedge 138 can be used to predict starting values for reading a next servo wedge 138. If corrupted values are used as starting values (or to predict starting values) when the next servo wedge 138 is read, it is possible that it will take at least the entire next servo wedge 138 for the servo AGC 428 and/or the servo PLL 426 to recover, causing the SAM in the next servo wedge 138 to be missed. This in turn can cause the servo demodulator 404 to completely lose lock. When this occurs, the whole concept, of having what is learned from one servo wedge 138 influencing how a next wedge 138 is read, backfires. Embodiments of the present invention, which are now described, reduce the likelihood, and hopefully prevent, the servo AGC 428 and the servo PLL 426 from retrieving and using garbage values after a bad SAM detection or missed SAM detection (i.e., no SAM detection) occurs. These embodiments use the knowledge that a bad SAM detection characterization or missed SAM detection occurred in a servo wedge 138, to indicate that it is likely that the servo AGC and servo PLL values during that servo wedge 138 are garbage (i.e., corrupted).

In accordance with embodiments of the present invention, discussed with reference to FIG. 11A, stored servo AGC and/or PLL values are only updated following a good SAM detection. Thus, if a SAM detection is characterized as a bad SAM detection, the AGC and/or servo PLL values stored in registers or memory are not updated with the values just determined by the servo AGC 428 and servo PLL 426. In other embodiments, discussed with reference to FIG. 11B, servo AGC and/or PLL values are stored for each servo wedge, but the just stored values are only used as starting values (or to predict starting values) for the next servo wedge following a good SAM detection (otherwise, previously stored servo AGC and/or PLL values are used as starting values, or used to predict the starting values). For example, before new servo AGC and/or PLL values are stored for a present servo wedge 138, the values being overwritten are stored in another location (e.g., in other registers or memory locations). Then, if the SAM detection for that servo wedge 138 is later characterized as a bad SAM detection, the previous servo AGC and/or PLL values can be restored. In each embodiment, when a next servo wedge 138 is read (following a servo wedge 138 where a bad SAM detection characterization occurred), the starting values for servo AGC 428 and/or PLL 426 will most likely not be garbage, thereby reducing the likelihood that the servo demodulator 404 will lose lock.

A particularly useful application of retaining AGC and/or PLL values from one wedge to the next is with media-written disks, where mis-centering of disks that are written outside of a disk drive may cause approximately±1% (max) frequency variation. Embodiments of the present invention can be used to improve the performance of disk drives using media-written disks. In such a case, a prediction of the appropriate PLL value for a next servo wedge can be determined as a function of the values saved from a previous wedge (one for which a good SAM detection occurred), the known eccentricity of the disk, and the number of wedges since that good SAM detection occurred.

Figure 11A:
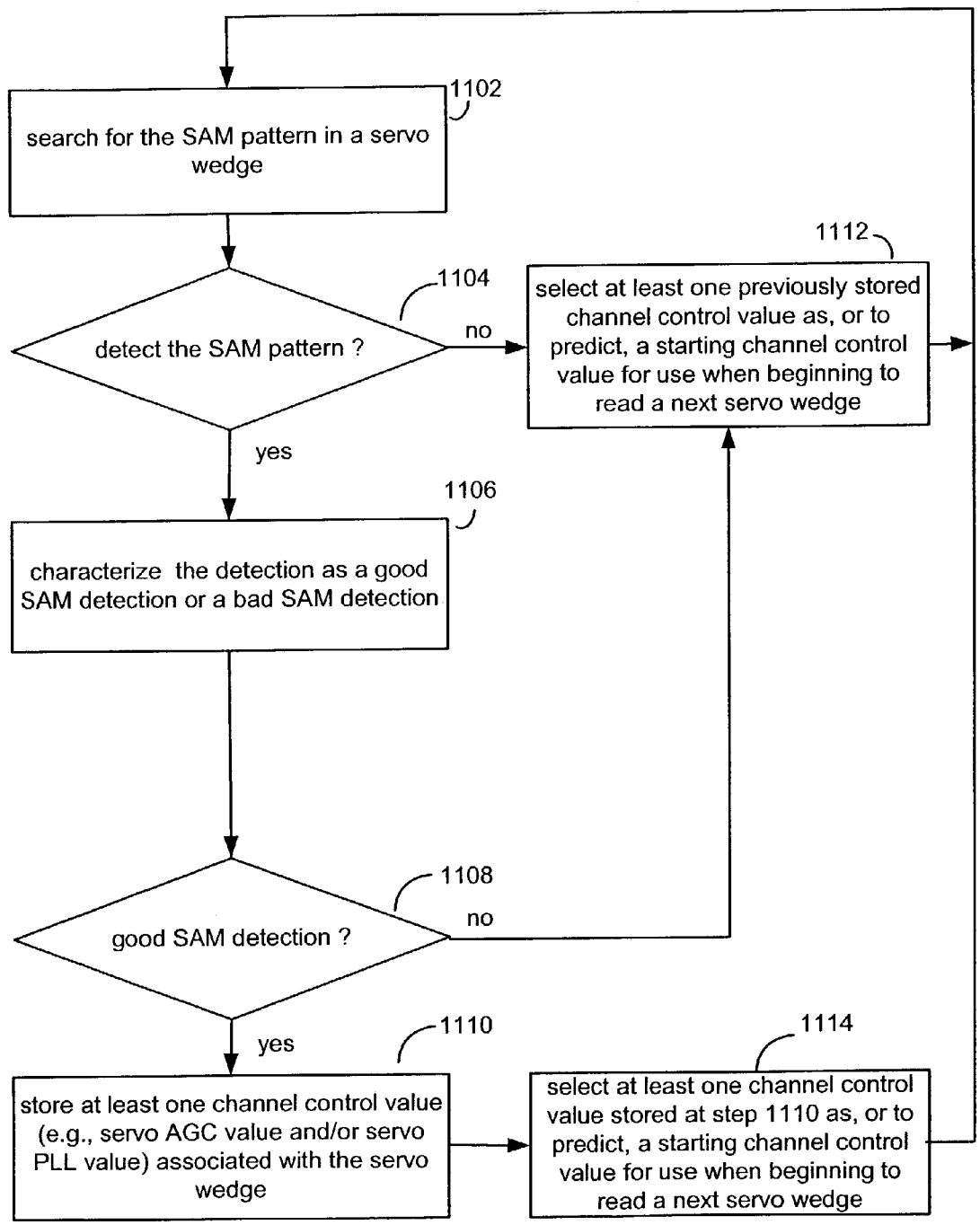
FIGS. 11A and 11B are high level flow diagrams that summarize various embodiments of the present invention in which characterizations of SAM pattern detections are used to decide which channel control values to use when beginning to demodulate a next servo wedge.

Many embodiment of the present invention, discussed above, can be summarized in the flow chart of FIG. 11A. Referring to FIG. 11A, at a step 1102, the SAM pattern is searched for in a servo wedge. If the SAM pattern is not detected in the servo wedge (i.e., if the answer to decision 1104 is no), then one or more previously stored (or predicted based on previously stored) channel control values are used as starting values when reading a next servo wedge, as specified at a step 112. The channel control values can be servo AGC and/or PLL values, as explained above. By using previously stored (or predicted based on previously stored) channel control values following a missed SAM detection (i.e., no SAM detection), garbage values will not be used for servo AGC, PLL, and the like, reducing the likelihood the servo demodulator 404 will lose lock, as explained above. Channel control values can be predicted, for example, based on a plurality of previously determined values. Simple averaging algorithms can be used, or more complex state space estimations can be used. For example, a starting PLL value can be predicted based on the PLL value stored for the most recent wedge wherein a good SAM detection occurred, the known eccentricity of the disk, and the number of wedges since that good SAM detection occurred.

If the SAM pattern is detected in the servo wedge (i.e., if the answer to decision 1104 is yes), then the detection is characterized as a good or a bad SAM detection, at a step 1106. Various embodiments for characterizing the detection of the SAM pattern are explained in detail above. For example, this can be accomplished by comparing the actual servo demodulation value(s) to the predicted servo demodulation value(s). Alternatively, or additionally, other factors, such as the extent that an actual SAM-to-SAM value (associated with a detected SAM pattern) differs from an EXPECTSAM value, and/or confidence determinations, can be used to characterize a detection of the SAM pattern as a good or a bad SAM detection.

If the detection of the SAM pattern is characterized as a bad SAM detection (i.e., if the answer to decision 1108 is no), then one or more previously stored (or predicted based on previously stored) channel control values are used as starting values when reading a next servo wedge, as specified at step 112. By using previously stored (or predicted based on previous stored) channel control values following a SAM detection characterized as a bad SAM detection, garbage values will not be used for servo AGC, PLL, and the like, reducing the likelihood the servo demodulator 404 will lose lock, as explained above.

If the detection of the SAM pattern is characterized as a good SAM detection (i.e., if the answer to decision 1108 is yes), then the channel control values determined for a servo wedge are stored, as specified at a step 1110. The just stored one or more channel control values are then used as starting values (or to predict starting values) when reading the next servo wedge, as specified at a step 1114.

Figure 11B:
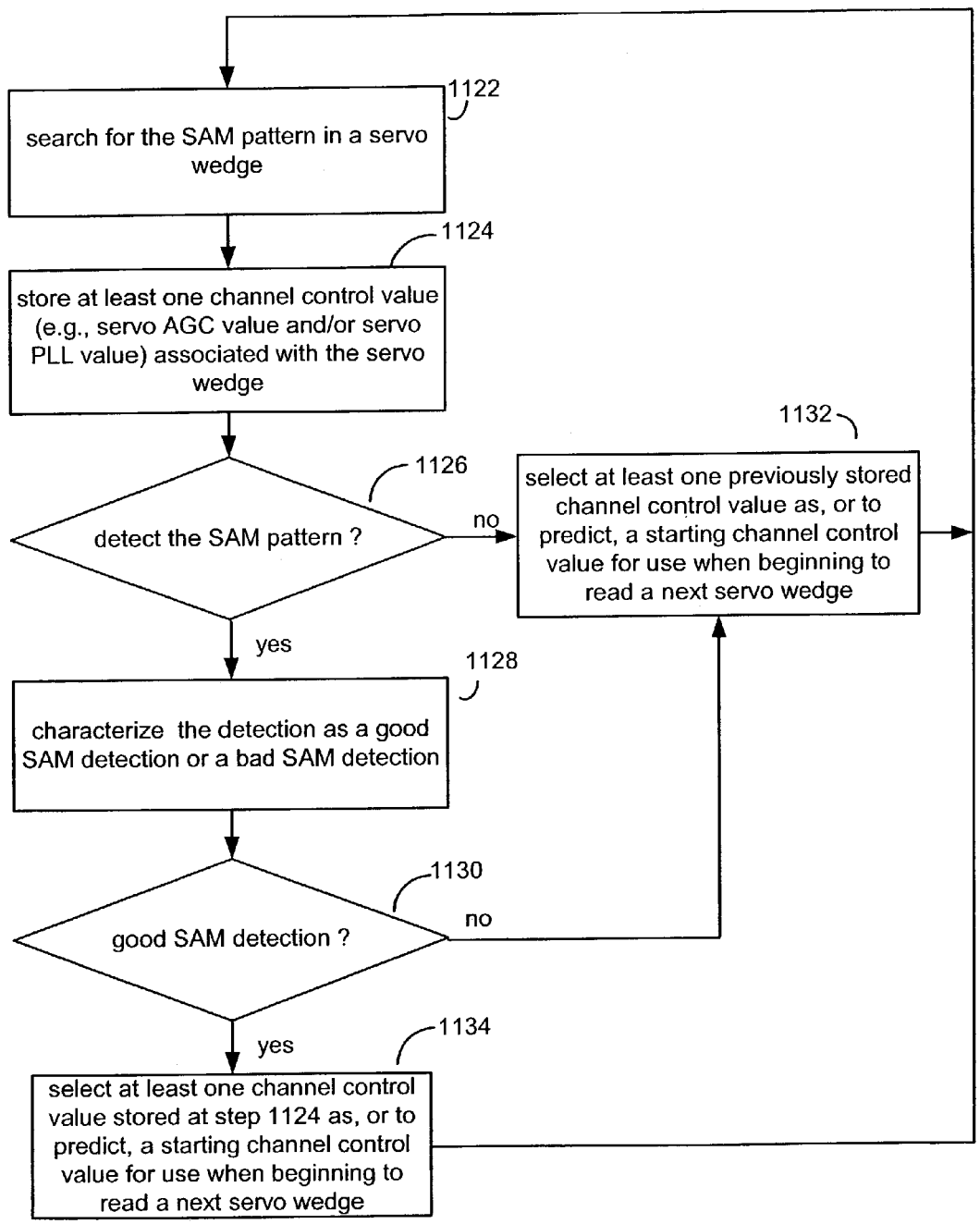

Other embodiments of the present invention, discussed above, can be summarized in the flow chart of FIG. 11B. Referring to FIG. 11B, at a step 1122, the SAM pattern is searched for in a servo wedge. At a step 1124, one or more channel control values are stored for the wedge just searched, regardless of whether a SAM pattern was detected. (Steps 1122 and 1124 can be reversed, so that channel control values are only stored if a SAM pattern was detected, regardless whether the SAM detection was characterized as good or bad.) If the SAM pattern is not detected in the servo wedge (i.e., if the answer to decision 1126 is no), then one or more previously stored (or predicted based on previously stored) channel control values are used as starting values when reading a next servo wedge.

If the SAM pattern is detected in the servo wedge (i.e., if the answer to decision 1126 is yes), then the detection is characterized as a good or a bad SAM detection at a step 1128. If the detection of the SAM pattern is characterized as a bad SAM detection (i.e., if the answer to decision 1130 is no), then one or more previously stored (or predicted based on previously stored) channel control values are used as starting values when reading a next servo wedge, as specified at a step 1132. If the detection of the SAM pattern is characterized as a good SAM detection (i.e., if the answer to decision 1130 is yes), then the just stored one or more channel control values are used as starting values (or to predict starting values) when reading a next servo wedge, as specified at a step 1134.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the claimed invention.

The breadth and scope of the present invention should not be limited by any of the above-described exemplary embodiments, but should be defined only in accordance with the following claims and their equivalents.

What is claimed:

1. A method for improving servo-demodulation robustness, comprising:
   (a) searching for multiple occurrences of a SAM pattern in a servo wedge;
   (b) for each detection of the SAM pattern in the servo wedge, characterizing the detection as a good SAM detection or a bad SAM detection; and
   (c) if more than one detection of the SAM pattern in the servo wedge are characterized as good SAM detections, selecting one of the detections as the best good SAM detection, and performing further servo functions based on the best good SAM detection.

2. The method of claim 1, wherein step (c) comprises using at least one servo demodulation value corresponding to the best good SAM detection for servo control.

3. The method of claim 1, wherein step (c) comprises searching for the SAM pattern in a next servo wedge based on when or where the SAM pattern, corresponding to the best good SAM detection, was detected.

4. The method of claim 1, wherein step (c) comprises:
   (c.1) using a servo demodulation value corresponding to the best good SAM detection for servo control; and
   (c.2) searching for the SAM pattern in the next servo wedge based on when or where the SAM pattern, corresponding to the best good SAM detection, was detected.

5. The method of claim 1, further comprising:
   (d) if the SAM pattern in not detected in the servo wedge, then searching for the SAM pattern in a next servo wedge based on when or where a detection of the SAM pattern, that was characterized as a good SAM detection, was detected in a previous servo wedge.

6. The method of claim 1, further comprising:
   (d) if only one detection of the SAM pattern in the servo wedge is characterized as a good SAM detection, searching for the SAM pattern in a next servo wedge based on where or when the SAM pattern, that was characterized as the one good SAM detection, was detected.

7. The method of claim 6, further comprising:
(d) if no detection of the SAM pattern in the servo wedge is characterized as a good SAM detection, then searching for the SAM pattern in a next servo wedge based on when or where the SAM pattern, that was characterized as a good SAM detection, was detected in a previous servo wedge.

8. The method of claim 1, further comprising:
(d) if no detection of the SAM pattern in the servo wedge is characterized as a good SAM detection, then halting reading data from and writing data to data fields following the servo wedge.

9. The method of claim 8, further comprising:
(e) if no detection of the SAM pattern in the servo wedge is characterized as a good SAM detection, then searching for the SAM pattern in a next servo wedge based on when or where the SAM pattern, that was characterized as a good SAM detection, was detected in a previous servo wedge.

10. The method of claim 1, wherein step (b) includes comparing at least one actual servo demodulation value corresponding to each detection of the SAM pattern to at least one predicted servo demodulation value to characterize each detection as either a good SAM detection or a bad SAM detection.

11. A method for improving servo-demodulation robustness, comprising:
(a) after detecting a SAM pattern in a first servo wedge, determining a set of at least one predicted servo demodulation value for a second servo wedge;
(b) searching for multiple occurrences of the SAM pattern in the second servo wedge;
(c) for each detection of the SAM pattern in the second servo wedge, determining a set of at least one actual servo demodulation value;
(d) for each detection of the SAM pattern in the second servo wedge, comparing the set of at least one predicted value to the corresponding set of at least one actual value to characterize the detection of the SAM pattern in the second servo wedge as either a good SAM detection or a bad SAM detection; and
(e) if more than one detection of the SAM pattern in the second servo wedge are characterized as good SAM detections, selecting one of the detections as a best good SAM detection, and performing further servo functions based on the best good SAM detection.

12. The method of claim 11, wherein step (e) comprises using a servo demodulation value corresponding to the SAM pattern, that was characterized as the best good SAM detection, for servo control.

13. The method of claim 11, wherein step (e) comprises searching for the SAM pattern in a third servo wedge based on when or where the SAM pattern, that was characterized as the best good SAM detection, was detected in the second servo wedge.

14. The method of claim 11, wherein step (e) comprises:
(e.1) using a servo demodulation value corresponding to the SAM pattern, that was characterized as the best good SAM detection, for servo control; and
(e.2) searching for the SAM pattern in a third servo wedge based on when or where the SAM pattern, that was characterized as the best good SAM detection, was detected in the second servo wedge.

15. The method of claim 11, further comprising:
(f) if only one detection of the SAM pattern in the second servo wedge is characterized as a good SAM detection, using a servo demodulation value corresponding the SAM pattern, that was characterized as the only good SAM detection, for servo control.

16. The method of claim 11, further comprising:
(f) if only one detection of the SAM pattern in the second servo wedge is characterized as a good SAM detection, searching for the SAM pattern in the third servo wedge based on when or where the SAM pattern, that was characterized as the only good SAM detection, was detected.

17. The method of claim 11, further comprising:
(f) if no good SAM detection occurs in the second servo wedge, searching for the SAM pattern in a third servo wedge based on when or where the detection of the SAM pattern in the first servo wedge was detected.

18. The method of claim 11, further comprising:
(f) if no good SAM detection occurs in the second servo wedge, halting reading data from and writing data to data fields following the second servo wedge.

19. The method of claim 18, further comprising:
(g) if no good SAM detection occurs in the second servo wedge, searching for the SAM pattern in the third servo wedge based on when or where the detection of the SAM pattern in the first servo wedge was detected.

20. A method for improving servo-demodulation robustness, comprising:
(a) predicting at least one servo demodulation value for a servo wedge;
(b) searching for more than one occurrence of a SAM pattern in the servo wedge;
(c) for each detection of the SAM pattern in the servo wedge, determining a set of at least one actual servo demodulation value;
(d) for each detection of a SAM pattern in the servo wedge, characterizing the detection of the SAM pattern as either a good SAM detection or a bad SAM detection, based at least in part on a comparison between the predicted and actual servo demodulation values; and
(e) if more than one good detection of the SAM pattern occurs in the servo wedge, selecting one of the detections as a best good SAM detection, and performing further servo functions based on the best good SAM detection.

21. A method for improving servo-demodulation robustness, comprising:
(a) predicting a set of at least one servo demodulation value, for a servo wedge, based on at least one previously known servo demodulation value;
(b) searching for multiple occurrences of a SAM pattern in the servo wedge;
(c) for each detection of the SAM pattern in the servo wedge, determining a set of at least one actual servo demodulation value;
(d) for each detection of the SAM pattern in the servo wedge, comparing the set of at least one predicted servo demodulation value to the corresponding set of at least one actual value; and
(e) selecting either the set of at least one predicted servo demodulation value, or one set of at least one actual servo demodulation value determined at step (c), based on the at least one comparison performed at step (d).

22. The method of claim 21, further comprising:
(e) performing servo control functions using at least one value in the set selected at step (d).

23. A method for improving servo-demodulation robustness, comprising:
  (a) searching for multiple occurrences of a SAM pattern in a servo wedge; and
  (b) if multiple detections of the SAM pattern occur, selecting one of the detections for use in performing further servo functions.

24. The method of claim 23, further comprising:
  (c) using at least one servo demodulation value corresponding to the selected SAM detection for servo control.

25. The method of claim 23, further comprising:
  (c) searching for the SAM pattern in a next servo wedge based on when or where the SAM pattern, corresponding to the selected SAM detection, was detected.

26. The method of claim 23, further comprising:
  (c.1) using a servo demodulation value corresponding to the selected SAM detection for servo control; and
  (c.2) searching for the SAM pattern in the next servo wedge based on when or where the SAM pattern, corresponding to the selected SAM detection, was detected.

27. The method of claim 23, further comprising:
  (c) if the SAM pattern in not detected in the servo wedge, then searching for the SAM pattern in a next servo wedge based on when or where a detection of the SAM pattern occurred in a previous servo wedge.

28. The method of claim 23, further comprising:
  (c) if no detection of the SAM pattern occurs in the servo wedge, then searching for the SAM pattern in a next servo wedge based on when or where the SAM pattern was detected in a previous servo wedge.

* * * * *

UNITED STATES PATENT AND TRADEMARK OFFICE
CERTIFICATE OF CORRECTION

PATENT NO. : 6,995,935 B2 Page 1 of 1
DATED : February 7, 2006
INVENTOR(S) : Richard M. Ehrlich It is certified that error appears in the above-identified patent and that said Letters Patent is hereby corrected as shown below:

<u>Column 24,</u>
Line 4, after "corresponding", insert -- to --.

Signed and Sealed this

Eighteenth Day of April, 2006

JON W. DUDAS
*Director of the United States Patent and Trademark Office*